US012749212B2

(12) United States Patent
Lien et al.

(10) Patent No.: US 12,749,212 B2
(45) Date of Patent: Sep. 29, 2026

(54) ADVANCED MEASURING TOOL FOR FENESTRATION REPLACEMENTS AND INSTALLATION

(71) Applicant: Andersen Corporation, Bayport, MN (US)

(72) Inventors: Jeff Lien, Clayton, WI (US); Arik Van Asten, Minneapolis, MN (US); Eric Lee Ottem, River Falls, WI (US)

(73) Assignee: Andersen Corporation, Bayport, MN (US)

( * ) Notice: Subject to any disclaimer, the term of this patent is extended or adjusted under 35 U.S.C. 154(b) by 516 days.

(21) Appl. No.: 18/212,549

(22) Filed: Jun. 21, 2023

(65) Prior Publication Data

US 2024/0005546 A1 Jan. 4, 2024

Related U.S. Application Data

(60) Provisional application No. 63/354,962, filed on Jun. 23, 2022.

(51) Int. Cl.

| | |
|---|---|
| ***G06T 7/62*** | (2017.01) |
| ***E06B 1/02*** | (2006.01) |
| ***G01C 11/10*** | (2006.01) |

(52) U.S. Cl.

CPC ................ *G06T 7/62* (2017.01); *G01C 11/10* (2013.01); *E06B 1/02* (2013.01); *G06T 2207/10024* (2013.01)

(58) Field of Classification Search

CPC . G06T 7/62; G06T 2207/10024; G01C 11/10; E06B 1/02; E06B 3/00; G06Q 10/20

See application file for complete search history.

(56) References Cited

U.S. PATENT DOCUMENTS

| | | | |
|---|---|---|---|
| 5,457,394 | A | 10/1995 | McEwan |
| 6,094,625 | A | 7/2000 | Ralston |
| 6,128,415 | A | 10/2000 | Hultgren et al. |
| 6,307,576 | B1 | 10/2001 | Rosenfeld |
| 6,381,583 | B1 | 4/2002 | Kenney |

(Continued)

OTHER PUBLICATIONS

"Final Office Action," for U.S. Appl. No. 17/941,687 mailed May 29, 2025 (34 pages).

(Continued)

*Primary Examiner* — Christopher Wait

(74) *Attorney, Agent, or Firm* — Pauly, DeVries Smith & Deffner LLC

(57) ABSTRACT

Embodiments herein relate to fenestration replacement measuring systems and fenestration receiving aperture measuring systems. In a first aspect, a fenestration replacement measuring system is included having a control circuit, and a solid object sensor, wherein the solid object sensor can be in electrical communication with the control circuit. The fenestration replacement measuring system can be configured to detect physical features of an existing fenestration unit using data from the solid object sensor, measure one or more dimensions of the existing fenestration unit using the physical features, and estimate one or more dimensions needed for fenestration replacement using the measured dimensions. Other embodiments are also included herein.

20 Claims, 20 Drawing Sheets

(56) References Cited

U.S. PATENT DOCUMENTS

| | | | |
|---|---|---|---|
| 6,606,744 | B1 | 8/2003 | Mikurak |
| 6,765,569 | B2 | 7/2004 | Neumann et al. |
| 6,952,496 | B2 | 10/2005 | Krumm |
| 7,204,428 | B2 | 4/2007 | Wilson |
| 7,274,380 | B2 | 9/2007 | Navab et al. |
| 7,277,572 | B2 | 10/2007 | MacInnes et al. |
| 7,283,214 | B2 | 10/2007 | Xu et al. |
| 7,533,501 | B2 | 5/2009 | Neal |
| 8,502,835 | B1 | 8/2013 | Meehan |
| 8,606,657 | B2 | 12/2013 | Chesnut et al. |
| 8,626,571 | B2 | 1/2014 | Nielsen et al. |
| 8,764,285 | B2 | 7/2014 | Lee et al. |
| 8,922,590 | B1 | 12/2014 | Luckett et al. |
| 8,994,645 | B1 | 3/2015 | Meehan |
| 9,147,213 | B2 | 9/2015 | Beaver et al. |
| 9,164,577 | B2 | 10/2015 | Tapley et al. |
| 9,767,720 | B2 | 9/2017 | Kinnebrew et al. |
| 9,817,848 | B2 | 11/2017 | McKinnon et al. |
| 9,965,787 | B2 | 5/2018 | Frederick et al. |
| 10,049,276 | B1 | 8/2018 | Harper et al. |
| 10,089,681 | B2 | 10/2018 | Ramos et al. |
| 10,127,733 | B2 | 11/2018 | Soon-Shiong |
| 10,311,637 | B2 | 6/2019 | Bharti et al. |
| 10,436,977 | B2 | 10/2019 | Bergman et al. |
| 10,521,089 | B2 | 12/2019 | Sonnenberg |
| 10,663,294 | B2 | 5/2020 | Pershing et al. |
| 11,024,088 | B2 | 6/2021 | Heinen et al. |
| 11,501,224 | B2 | 11/2022 | Lien |
| 12,597,212 | B2 | 4/2026 | Lien |
| 2002/0093538 | A1 | 7/2002 | Carlin |
| 2002/0136442 | A1 | 9/2002 | Jones et al. |
| 2003/0014212 | A1 | 1/2003 | Ralston et al. |
| 2003/0046689 | A1 | 3/2003 | Gaos |
| 2003/0174178 | A1 | 9/2003 | Hodges |
| 2004/0249497 | A1 | 12/2004 | Saigh et al. |
| 2005/0046584 | A1 | 3/2005 | Breed |
| 2006/0289637 | A1 | 12/2006 | Brice et al. |
| 2007/0038944 | A1 | 2/2007 | Carignano et al. |
| 2007/0043466 | A1 | 2/2007 | Vesely et al. |
| 2007/0086624 | A1 | 4/2007 | Breed et al. |
| 2007/0087756 | A1 | 4/2007 | Hoffberg |
| 2007/0127426 | A1 | 6/2007 | Watters et al. |
| 2007/0138268 | A1 | 6/2007 | Tuchman |
| 2007/0202472 | A1 | 8/2007 | Moritz |
| 2009/0063557 | A1 | 3/2009 | MacPherson |
| 2009/0125283 | A1 | 5/2009 | Conover |
| 2010/0056928 | A1 | 3/2010 | Zuzak et al. |
| 2010/0064596 | A1 | 3/2010 | Bowsher |
| 2011/0166824 | A1 | 7/2011 | Haisty et al. |
| 2012/0078685 | A1 | 3/2012 | Krebs et al. |
| 2012/0089410 | A1 | 4/2012 | Mikurak |
| 2012/0113140 | A1 | 5/2012 | Hilliges et al. |
| 2012/0190386 | A1 | 7/2012 | Anderson |
| 2012/0194554 | A1 | 8/2012 | Kaino et al. |
| 2012/0298449 | A1 | 11/2012 | Kreller |
| 2012/0299963 | A1 | 11/2012 | Wegrzyn et al. |
| 2013/0073388 | A1 | 3/2013 | Heath |
| 2013/0128011 | A1 | 5/2013 | Tu et al. |
| 2013/0155058 | A1 | 6/2013 | Golparvar-Fard et al. |
| 2014/0257862 | A1 | 9/2014 | Billman et al. |
| 2014/0278280 | A1 | 9/2014 | Pardo-fernandez |
| 2014/0368378 | A1 | 12/2014 | Crain et al. |
| 2015/0112647 | A1 | 4/2015 | Currin et al. |
| 2015/0127165 | A1 | 5/2015 | Quam et al. |
| 2015/0242095 | A1 | 8/2015 | Sonnenberg |
| 2016/0010883 | A1 | 1/2016 | Jornitz et al. |
| 2016/0259341 | A1 | 9/2016 | High et al. |
| 2017/0053042 | A1 | 2/2017 | Sugden et al. |
| 2017/0191262 | A1 | 7/2017 | Forbis et al. |
| 2017/0330063 | A1 | 11/2017 | Cheung |
| 2018/0109756 | A1 | 4/2018 | White |
| 2018/0349862 | A1* | 12/2018 | Ripley .................. G06Q 40/08 |
| 2019/0228370 | A1 | 7/2019 | Lien |
| 2020/0143453 | A1* | 5/2020 | Ripley ...................... G06T 7/62 |
| 2020/0312029 | A1 | 10/2020 | Heinen et al. |
| 2021/0383033 | A1 | 12/2021 | Glenn et al. |
| 2023/0186199 | A1 | 6/2023 | Lien |
| 2023/0186320 | A1 | 6/2023 | Wegele et al. |
| 2024/0020929 | A1 | 1/2024 | Tyrrell et al. |
| 2024/0169720 | A1 | 5/2024 | Suits et al. |
| 2025/0207914 | A1 | 6/2025 | Lien et al. |

OTHER PUBLICATIONS

"Response to Final Office Action," for U.S. Appl. No. 17/984,819, filed May 22, 2025 (8 pages.

"Response to Non-Final Office Action," for U.S. Appl. No. 17/941,687, filed Mar. 5, 2025 (15 pages).

J., Douglas Balcomb, "Building Solar Gain Modeling," Passive Solar Buildings, MIT Press, 2008, pp. 39-109. (Year: 2008).

"Non-Final Office Action," for U.S. Appl. No. 17/984,819 mailed Jun. 13, 2024 (45 pages).

"Final Office Action," for U.S. Appl. No. 17/984,819 mailed Jan. 22, 2025 (51 pages).

"Final Office Action," for U.S. Appl. No. 17/984,819 mailed Jan. 19, 2024 (36 pages).

"Response to Non-Final Office Action," for U.S. Appl. No. 17/984,819, filed Oct. 17, 2023 (9 pages).

"Final Office Action," for U.S. Appl. No. 16/256,486 mailed Sep. 28, 2021 (45 pages).

"Non-Final Office Action," for U.S. Appl. No. 16/256,486 mailed Feb. 17, 2022 (28 pages).

"Non-Final Office Action," for U.S. Appl. No. 16/256,486 mailed Mar. 17, 2021 (26 pages).

"Non-Final Office Action," for U.S. Appl. No. 17/984,819 mailed Jun. 22, 2023 (28 pages).

"Notice of Allowance," for U.S. Appl. No. 16/256,486 mailed Jul. 12, 2022 (12 pages).

"Response to Final Office Action," for U.S. Appl. No. 16/256,486, filed Jan. 26, 2022 (10 pages).

"Response to Non-Final Office Action," for U.S. Appl. No. 16/256,486, filed Jun. 17, 2021 (10 pages).

"Response to Non-Final Office Action," for U.S. Appl. No. 16/256,486, filed May 17, 2022 (10 pages).

"Setting New Standards for Safety—The Florida Building Code," Florida Building Commission, Florida Department of Community Affairs, downloaded on Sep. 7, 2021 (58 pages).

Asgari, Zeynab, et al. "Advanced Virtual Reality Applications and Intelligent Agents for Construction Process Optimisation and Defect Prevention," Procedia Engineering 196 (2017): 1130-1137 (9 pages).

Cushman, Ted "Speccing Windows in High Wind Zones," Coastal Contractor Winter 2005 pp. 22-28 (6 pages).

Fernandes, Kiran Jude, et al. "Adoption of Virtual Reality Within Construction Processes: A Factor Analysis Approach," Technovation 26.1 (2006): 111-120 (10 pages).

Jiao, Yi, et al. "Towards Cloud Augmented Reality for Construction Application by BIM and SNS Integration," Automation in Construction 33 (2013); 37-47 (11 pages).

Moon, D. Y., et al. "Augmented Reality-Based On-Site Pipe Assembly Process Management Using Smart Glasses," ISARC. Proceedings of the International Symposium on Automation and Robotics in Construction. vol. 32. IAARC Publications, 2015 (8 pages).

Renner, Patrick, et al. "Evaluation of Attention Guiding Techniques for Augmented Reality-Based Assistance in Picking and Assembly Tasks," Proceedings of the 22nd International Conference on Intelligent User Interfaces Comparison, 2017 (4 pages).

Rezkallah, Meena "Wind Load Calculation as per ASCE 7-16," Guide to the Wind Load Provisions of ASCE 7-16. Article available from Little P.Eng Engineers @ url <http:/www.littlepeng.com/single-post/wond-load-calculation-as-per-asce-7-16> Downloaded Sep. 10, 2021 (7 pages).

Woksepp, Stefan, et al. "Using Virtual Reality in Large-Scale Industry Project," Electronic Journal of Information Technology in Construction 11 (2006): 627-640 (15 pages).

Zhou, Ying, et al. "Implementation of Augmented Reality for Segment Displacement Inspection During Tunneling Construction," Automation in Construction 82 (2017): 112-121 (10 pages).

(56) References Cited

OTHER PUBLICATIONS

"Non-Final Office Action," for U.S. Appl. No. 17/941,687 mailed Dec. 5, 2024 (38 pages).
"Response to Non-Final Office Action, "for U.S. Appl. No. 17/984,819, filed Oct. 14, 2024 (13 pages).
Park, June Juyeon, "Design of an enhanced defect identification system for commercial building inspection," 2017 Integrated Communications, Navigation and Surveillance Conference (ICNS), Herndon, VA, USA, 2017, pp. 1-48, doi: 10.1109/ICNSURV.2017.8012025. (Year: 2017).
"Non-Final Office Action," for U.S. Appl. No. 17/941,687 mailed Sep. 30, 2025 (27 pages).
"Non-Final Office Action," for U.S. Appl. No. 17/984,819, filed Jul. 1, 2025 (59 pages).
"Notice of Allowance," for U.S. Appl. No. 17/984,819 mailed Nov. 17, 2025 (20 pages).
"Response to Final Office Action," for U.S. Appl. No. 17/941,687, filed Aug. 29, 2025 (12 pages).
"Response to Non-Final Office Action," for U.S. Appl. No. 17/984,819, filed Oct. 1, 2025 (15 pages).
"Corrected Notice of Allowability," for U.S. Appl. No. 17/984,819 mailed Feb. 11, 2026 (4 pages).
"Response to Non-Final Office Action," for U.S. Appl. No. 17/941,687, filed Jan. 27, 2026 (14 pages).
"Final Office Action," for U.S. Appl. No. 17/941,687 mailed Apr. 13, 2026 (31 pages).
"Response to Final Office Action," for U.S. Appl. No. 17/941,687, filed on Jul. 13, 2026 (20 pages).

* cited by examiner

802

| MAKE | MODEL | OFFSET A | OFFSET B | OFFSET C |
|---|---|---|---|---|
| Company A | Model 1 | 2" | 1.5" | 0.5" |
| Company B | Model 1 | 1.8" | 1.2" | 0.75" |
| ... | ... | ... | ... | ... |
| ... | ... | ... | ... | ... |
| ... | ... | ... | ... | ... |

FIG. 8

ADVANCED MEASURING TOOL FOR FENESTRATION REPLACEMENTS AND INSTALLATION

This application claims the benefit of U.S. Provisional Application No. 63/354,962, filed Jun. 23, 2022, the content of which is herein incorporated by reference in its entirety.

FIELD

Embodiments herein relate to fenestration replacement measuring systems and fenestration receiving aperture measuring systems.

BACKGROUND

Fenestrations, such as windows and doors, are installed when structures are originally built, but they are also installed later in repair and replacement scenarios. Fenestrations for original installation and/or for replacement must be of the correct size to fit within a rough opening within a wall and/or within a frame in a rough opening. As such, installing and/or replacing a fenestration unit requires accurate measurements to be made.

SUMMARY

Embodiments herein relate to fenestration replacement measuring systems and fenestration receiving aperture measuring systems. In a first aspect, a fenestration replacement measuring system can be included having a control circuit and a solid object sensor in electrical communication with the control circuit. The fenestration replacement measuring system can be configured to detect physical features of an existing fenestration unit using data from the solid object sensor, measure one or more dimensions of the existing fenestration unit using the physical features, and estimate one or more dimensions needed for fenestration replacement using the measured dimensions.

In a second aspect, in addition to one or more of the preceding or following aspects, or in the alternative to some aspects, the physical features can include at least one selected from the group consisting of spatial points, edges, surfaces, and corners.

In a third aspect, in addition to one or more of the preceding or following aspects, or in the alternative to some aspects, the solid object sensor can include a surface sensor.

In a fourth aspect, in addition to one or more of the preceding or following aspects, or in the alternative to some aspects, the solid object sensor can include at least one selected from the group consisting of an optical sensor, a LIDAR sensor, a penetrating electromagnetic wave sensor, a thermal imaging sensor, and an X-ray sensor.

In a fifth aspect, in addition to one or more of the preceding or following aspects, or in the alternative to some aspects, the one or more dimensions needed for fenestration replacement can include at least one selected from the group consisting of a rough opening size and a frame size.

In a sixth aspect, in addition to one or more of the preceding or following aspects, or in the alternative to some aspects, the fenestration replacement measuring system can be configured to detect physical features of an existing fenestration unit using data from the solid object sensor while pointing upward at an angle of at least 30 degrees relative to a horizontal plane.

In a seventh aspect, in addition to one or more of the preceding or following aspects, or in the alternative to some aspects, the fenestration replacement measuring system can be configured to detect physical features of an existing fenestration unit using data from the solid object sensor while pointing upward at an angle of at least 45 degrees relative to a horizontal plane.

In an eighth aspect, in addition to one or more of the preceding or following aspects, or in the alternative to some aspects, the fenestration replacement measuring system can be configured to interpolate portions of the physical features that are at least partially obscured.

In a ninth aspect, in addition to one or more of the preceding or following aspects, or in the alternative to some aspects, wherein the physical features that are at least partially obscured are located adjacent the sill of the existing fenestration unit.

In a tenth aspect, in addition to one or more of the preceding or following aspects, or in the alternative to some aspects, the fenestration replacement measuring system can be configured to cross-reference dimensions of the existing fenestration unit as measured from an interior side with those as measured from an exterior side.

In an eleventh aspect, in addition to one or more of the preceding or following aspects, or in the alternative to some aspects, the fenestration replacement measuring system can be configured to cross-reference dimensions of the existing fenestration unit as measured from an interior side with those as measured from an exterior side using one or more physical and/or virtual markers.

In a twelfth aspect, in addition to one or more of the preceding or following aspects, or in the alternative to some aspects, the fenestration replacement measuring system can be configured to calculate differences in dimensions of the existing fenestration unit as measured from an interior side with those as measured from an exterior side.

In a thirteenth aspect, in addition to one or more of the preceding or following aspects, or in the alternative to some aspects, the fenestration replacement measuring system can be configured to issue an alert or warning to a system user if the calculated differences exceed a threshold value.

In a fourteenth aspect, in addition to one or more of the preceding or following aspects, or in the alternative to some aspects, the fenestration replacement measuring system can be configured to create a dimensional model for a replacement fenestration unit using at least one of the measured one or more dimensions of the existing fenestration unit and the estimated one or more dimensions needed for fenestration replacement.

In a fifteenth aspect, in addition to one or more of the preceding or following aspects, or in the alternative to some aspects, the fenestration replacement measuring system can be configured to accept user input from a system user regarding the physical features and incorporate the same when generating a measurement of the existing fenestration unit or an estimate of the dimensions needed for a fenestration replacement.

In a sixteenth aspect, in addition to one or more of the preceding or following aspects, or in the alternative to some aspects, the system user can be located at a site of the existing fenestration unit.

In a seventeenth aspect, in addition to one or more of the preceding or following aspects, or in the alternative to some aspects, the system user can be located remotely from a site of the existing fenestration unit.

In an eighteenth aspect, in addition to one or more of the preceding or following aspects, or in the alternative to some aspects, the user input can include locations of physical features and/or points regarding the same.

In a nineteenth aspect, in addition to one or more of the preceding or following aspects, or in the alternative to some aspects, the fenestration replacement measuring system can be configured to accept user input from a system user regarding the physical features and store the same.

In a twentieth aspect, in addition to one or more of the preceding or following aspects, or in the alternative to some aspects, the fenestration replacement measuring system can be configured to use the stored user input as part of a training data set in a supervised machine learning operation to generate a machine learning model for dimension estimation.

In a twenty-first aspect, in addition to one or more of the preceding or following aspects, or in the alternative to some aspects, the one or more dimensions can be measured with an accuracy of within ⅛ inch at a distance of 20 feet.

In a twenty-second aspect, in addition to one or more of the preceding or following aspects, or in the alternative to some aspects, the fenestration replacement measuring system can be configured to generate a display output including a dimensionally accurate replacement fenestration unit superimposed over the existing fenestration unit.

In a twenty-third aspect, in addition to one or more of the preceding or following aspects, or in the alternative to some aspects, the display output can include an augmented reality (AR) display.

In a twenty-fourth aspect, in addition to one or more of the preceding or following aspects, or in the alternative to some aspects, the fenestration replacement measuring system can be configured to detect physical features of a replacement fenestration unit after installation using data from the solid object sensor and measure one or more dimensions of the replacement fenestration unit using the physical features.

In a twenty-fifth aspect, in addition to one or more of the preceding or following aspects, or in the alternative to some aspects, the fenestration replacement measuring system can be configured to calculate a number of scaffolds and/or ladders needed to replace the existing fenestration unit.

In a twenty-sixth aspect, in addition to one or more of the preceding or following aspects, or in the alternative to some aspects, the fenestration replacement measuring system can be configured to calculate amounts of tools and resources needed to replace the existing fenestration unit.

In a twenty-seventh aspect, in addition to one or more of the preceding or following aspects, or in the alternative to some aspects, the fenestration replacement measuring system can be configured to identify at least one of warping, color distortion or irregularities, and out of square conditions of an existing fenestration, or frame, or rough opening.

In a twenty-eighth aspect, in addition to one or more of the preceding or following aspects, or in the alternative to some aspects, the fenestration replacement measuring system can be configured to issue an alert or warning to a system user if warping, color distortion or irregularities, or an out of square condition can be detected.

In a twenty-ninth aspect, in addition to one or more of the preceding or following aspects, or in the alternative to some aspects, the fenestration replacement measuring system can be configured to initiate review by a specialist or project manager if warping, color distortion or irregularities, or an out of square condition can be detected.

In a thirtieth aspect, in addition to one or more of the preceding or following aspects, or in the alternative to some aspects, the fenestration replacement measuring system can be configured to automatically take horizontal measurements of a feature at multiple locations and compare a midpoint measurement with at least one of a top measurement and a bottom measurement.

In a thirty-first aspect, in addition to one or more of the preceding or following aspects, or in the alternative to some aspects, the fenestration replacement measuring system can be configured to issue an alert or warning to a system user if the midpoint measurement differs from the top measurement or the bottom measurement by at least a threshold amount.

In a thirty-second aspect, in addition to one or more of the preceding or following aspects, or in the alternative to some aspects, the fenestration replacement measuring system can be configured to identify an exterior wall material.

In a thirty-third aspect, in addition to one or more of the preceding or following aspects, or in the alternative to some aspects, the fenestration replacement measuring system configured to initiate review by a specialist or project manager if a predetermined exterior wall material can be identified.

In a thirty-fourth aspect, in addition to one or more of the preceding or following aspects, or in the alternative to some aspects, the fenestration replacement measuring system can be configured to send data to a specialist or project manager at a remote site in real time.

In a thirty-fifth aspect, in addition to one or more of the preceding or following aspects, or in the alternative to some aspects, the fenestration replacement measuring system can be configured to display an overlay of measurements on an actual image of a fenestration.

In a thirty-sixth aspect, in addition to one or more of the preceding or following aspects, or in the alternative to some aspects, the fenestration replacement measuring system can be configured to store measured dimensions and/or estimated dimensions needed for fenestration replacement along with sensor data for later review off site.

In a thirty-seventh aspect, in addition to one or more of the preceding or following aspects, or in the alternative to some aspects, the fenestration replacement measuring system can be configured to detect the presence of a screen on the existing fenestration unit using data from the solid object sensor.

In a thirty-eighth aspect, in addition to one or more of the preceding or following aspects, or in the alternative to some aspects, the fenestration replacement measuring system can be configured to initiate a responsive action when the presence of a screen is detected.

In a thirty-ninth aspect, in addition to one or more of the preceding or following aspects, or in the alternative to some aspects, the existing fenestration unit can include at least one selected from the group consisting of a window, a patio door, and an entry door.

In a fortieth aspect, in addition to one or more of the preceding or following aspects, or in the alternative to some aspects, the fenestration replacement can be full or partial.

In a forty-first aspect, in addition to one or more of the preceding or following aspects, or in the alternative to some aspects, the fenestration replacement measuring system can be configured to overweight measurement points that intersect with a selected plane.

In a forty-second aspect, in addition to one or more of the preceding or following aspects, or in the alternative to some aspects, the fenestration replacement measuring system can be configured to combine two or more measurement points to create a virtual measurement point.

In a forty-third aspect, a method of measuring dimensions needed for a fenestration replacement can be included. The method can include detecting physical features of an existing fenestration unit using data from a solid object sensor, measuring one or more dimensions of the existing fenestration unit using the physical features, and estimating one or more dimensions needed for fenestration replacement using the measured dimensions.

In a forty-fourth aspect, in addition to one or more of the preceding or following aspects, or in the alternative to some aspects, the method can further include detecting physical features of the existing fenestration unit using data from the solid object sensor while pointing upward at an angle of at least 30 degrees relative to a horizontal plane.

In a forty-fifth aspect, in addition to one or more of the preceding or following aspects, or in the alternative to some aspects, the method can further include detecting physical features of the existing fenestration unit using data from the solid object sensor while pointing upward at an angle of at least 45 degrees relative to a horizontal plane.

In a forty-sixth aspect, in addition to one or more of the preceding or following aspects, or in the alternative to some aspects, the method can further include interpolating portions of the physical features that are at least partially obscured.

In a forty-seventh aspect, in addition to one or more of the preceding or following aspects, or in the alternative to some aspects, the method can further include cross-referencing dimensions of the existing fenestration unit as measured from an interior side with those as measured from an exterior side.

In a forty-eighth aspect, in addition to one or more of the preceding or following aspects, or in the alternative to some aspects, the method can further include cross-referencing dimensions of the existing fenestration unit as measured from an interior side with those as measured from an exterior side using one or more physical and/or virtual markers.

In a forty-ninth aspect, in addition to one or more of the preceding or following aspects, or in the alternative to some aspects, the method can further include calculating differences in dimensions of the existing fenestration unit as measured from an interior side with those as measured from an exterior side.

In a fiftieth aspect, in addition to one or more of the preceding or following aspects, or in the alternative to some aspects, the method can further include issuing an alert or warning to a system user if the calculated differences exceed a threshold value.

In a fifty-first aspect, in addition to one or more of the preceding or following aspects, or in the alternative to some aspects, the method can further include creating a dimensional model for a replacement fenestration unit using at least one of the measured one or more dimensions of the existing fenestration unit and the estimated one or more dimensions needed for fenestration replacement.

In a fifty-second aspect, in addition to one or more of the preceding or following aspects, or in the alternative to some aspects, the method can further include accepting user input from a system user regarding the physical features and incorporating the same when generating a measurement of the existing fenestration unit or an estimate of the dimensions needed for a fenestration replacement.

In a fifty-third aspect, in addition to one or more of the preceding or following aspects, or in the alternative to some aspects, the method can further include accepting user input from a system user regarding the physical features and storing the same.

In a fifty-fourth aspect, in addition to one or more of the preceding or following aspects, or in the alternative to some aspects, the method can further include using the stored user input as part of a training data set in a supervised machine learning operation to generate a machine learning model for dimension estimation.

In a fifty-fifth aspect, in addition to one or more of the preceding or following aspects, or in the alternative to some aspects, the method can further include generating a display output including a dimensionally accurate replacement fenestration unit superimposed over the existing fenestration unit.

In a fifty-sixth aspect, in addition to one or more of the preceding or following aspects, or in the alternative to some aspects, the method can further include detecting physical features of a replacement fenestration unit after installation using data from the solid object sensor and measuring one or more dimensions of the replacement fenestration unit using the physical features.

In a fifty-seventh aspect, in addition to one or more of the preceding or following aspects, or in the alternative to some aspects, the method can further include calculating a number of scaffolds and/or ladders needed to replace the existing fenestration unit.

In a fifty-eighth aspect, in addition to one or more of the preceding or following aspects, or in the alternative to some aspects, the method can further include calculating amounts of tools and resources needed to replace the existing fenestration unit.

In a fifty-ninth aspect, in addition to one or more of the preceding or following aspects, or in the alternative to some aspects, the method can further include identifying at least one of warping, color distortion or irregularities, and out of square conditions of an existing fenestration, or frame, or rough opening.

In a sixtieth aspect, in addition to one or more of the preceding or following aspects, or in the alternative to some aspects, the method can further include issuing an alert or warning to a system user if warping, color distortion or irregularities, or an out of square condition can be detected.

In a sixty-first aspect, in addition to one or more of the preceding or following aspects, or in the alternative to some aspects, the method can further include initiating review by a specialist or project manager if warping, color distortion or irregularities, or an out of square condition can be detected.

In a sixty-second aspect, in addition to one or more of the preceding or following aspects, or in the alternative to some aspects, the method can further include identifying an exterior wall material.

In a sixty-third aspect, in addition to one or more of the preceding or following aspects, or in the alternative to some aspects, the method can further include initiating review by a specialist or project manager if a predetermined exterior wall material can be identified.

In a sixty-fourth aspect, in addition to one or more of the preceding or following aspects, or in the alternative to some aspects, the method can further include displaying an overlay of measurements on an actual image of a fenestration.

In a sixty-fifth aspect, in addition to one or more of the preceding or following aspects, or in the alternative to some aspects, the method can further include storing measured dimensions and/or estimated dimensions needed for fenestration replacement along with sensor data for later review off site.

In a sixty-sixth aspect, in addition to one or more of the preceding or following aspects, or in the alternative to some aspects, the method can further include detecting the presence of a screen on the existing fenestration unit using data from the solid object sensor.

In a sixty-seventh aspect, in addition to one or more of the preceding or following aspects, or in the alternative to some aspects, the method can further include initiating a responsive action when the presence of a screen is detected.

In a sixty-eighth aspect, a fenestration receiving aperture measuring system can be included having a control circuit and a solid object sensor in electrical communication with the control circuit. The fenestration receiving aperture measuring system can be configured to detect physical features of an existing building structure using data from the solid object sensor, measure one or more dimensions of the existing building structure using the detected surfaces, and estimate one or more dimensions needed for fenestration installation using the measured dimensions.

In a sixty-ninth aspect, in addition to one or more of the preceding or following aspects, or in the alternative to some aspects, the physical features can include at least one selected from the group consisting of spatial points, edges, surfaces, and corners.

In a seventieth aspect, in addition to one or more of the preceding or following aspects, or in the alternative to some aspects, the physical features can include corners within the same plane.

In a seventy-first aspect, in addition to one or more of the preceding or following aspects, or in the alternative to some aspects, the solid object sensor can include at least one selected from the group consisting of an optical sensor, a LIDAR sensor, a penetrating electromagnetic wave sensor, a thermal imaging sensor, and an X-ray sensor.

In a seventy-second aspect, in addition to one or more of the preceding or following aspects, or in the alternative to some aspects, the one or more dimensions needed for fenestration installation can include at least one selected from the group consisting of a rough opening size and a frame size.

In a seventy-third aspect, in addition to one or more of the preceding or following aspects, or in the alternative to some aspects, the fenestration receiving aperture measuring system can be configured to interpolate portions of the physical features that are at least partially obscured.

In a seventy-fourth aspect, in addition to one or more of the preceding or following aspects, or in the alternative to some aspects, the fenestration receiving aperture measuring system can be configured to cross-reference dimensions of the existing fenestration unit as measured from an interior side with those as measured from an exterior side.

In a seventy-fifth aspect, in addition to one or more of the preceding or following aspects, or in the alternative to some aspects, the fenestration receiving aperture measuring system can be configured to cross-reference dimensions of the existing fenestration unit as measured from an interior side with those as measured from an exterior side using one or more physical and/or virtual markers.

In a seventy-sixth aspect, in addition to one or more of the preceding or following aspects, or in the alternative to some aspects, the fenestration receiving aperture measuring system can be configured to create a dimensional model for a fenestration unit using detected physical features of the existing building structure.

In a seventy-seventh aspect, in addition to one or more of the preceding or following aspects, or in the alternative to some aspects, the fenestration receiving aperture measuring system can be configured to accept user input regarding the physical features and incorporate the same when generating a measurement of the existing building structure or an estimate of the dimensions needed for fenestration installation.

In a seventy-eighth aspect, in addition to one or more of the preceding or following aspects, or in the alternative to some aspects, the fenestration receiving aperture measuring system can be configured to generate a display output including a dimensionally accurate fenestration unit superimposed over the receiving aperture.

In a seventy-ninth aspect, in addition to one or more of the preceding or following aspects, or in the alternative to some aspects, the fenestration receiving aperture measuring system can be configured to calculate a number of scaffolds and/or ladders needed for fenestration installation.

In an eightieth aspect, in addition to one or more of the preceding or following aspects, or in the alternative to some aspects, the fenestration receiving aperture measuring system can be configured to identify at least one of warping, color distortion or irregularities, and out of square conditions of an existing building structure.

In an eighty-first aspect, in addition to one or more of the preceding or following aspects, or in the alternative to some aspects, the fenestration receiving aperture measuring system can be configured to issue an alert or warning to a system user if warping, color distortion or irregularities, or an out of square condition is detected.

In an eighty-second aspect, in addition to one or more of the preceding or following aspects, or in the alternative to some aspects, the fenestration receiving aperture measuring system can be configured to initiate review by a specialist or project manager if warping, color distortion or irregularities, or an out of square condition is detected.

In an eighty-third aspect, in addition to one or more of the preceding or following aspects, or in the alternative to some aspects, the fenestration receiving aperture measuring system can be configured to identify an exterior wall material.

In an eighty-fourth aspect, in addition to one or more of the preceding or following aspects, or in the alternative to some aspects, the fenestration receiving aperture measuring system configured to initiate review by a specialist or project manager if a predetermined exterior wall material is identified.

In an eighty-fifth aspect, in addition to one or more of the preceding or following aspects, or in the alternative to some aspects, the fenestration receiving aperture measuring system can be configured to display an overlay of measurements on an actual image of a fenestration.

In an eighty-sixth aspect, in addition to one or more of the preceding or following aspects, or in the alternative to some aspects, the fenestration receiving aperture measuring system can be configured to store measured dimensions and/or estimated dimensions for later review off site.

In an eighty-seventh aspect, a method of measuring dimensions needed for a fenestration installation project can be included. The method can include detecting physical features of an existing building structure using data from a solid object sensor, measuring one or more dimensions of the existing building structure using the detected surfaces, and estimating one or more dimensions needed for fenestration installation using the measured dimensions.

In an eighty-eighth aspect, in addition to one or more of the preceding or following aspects, or in the alternative to some aspects, the method can further include interpolating portions of the physical features that are at least partially obscured.

In an eighty-ninth aspect, in addition to one or more of the preceding or following aspects, or in the alternative to some aspects, the method can further include cross-referencing dimensions of the existing fenestration unit as measured from an interior side with those as measured from an exterior side.

In a ninetieth aspect, in addition to one or more of the preceding or following aspects, or in the alternative to some aspects, the method can further include cross-referencing dimensions of the existing fenestration unit as measured from an interior side with those as measured from an exterior side using one or more physical and/or virtual markers.

In a ninety-first aspect, in addition to one or more of the preceding or following aspects, or in the alternative to some aspects, the method can further include creating a dimensional model for a fenestration unit using detected physical features of the existing building structure.

In a ninety-second aspect, in addition to one or more of the preceding or following aspects, or in the alternative to some aspects, the method can further include accepting user input regarding the physical features and incorporating the same when generating a measurement of the existing building structure or an estimate of the dimensions needed for fenestration installation.

In a ninety-third aspect, in addition to one or more of the preceding or following aspects, or in the alternative to some aspects, the method can further include generating a display output including a dimensionally accurate fenestration unit superimposed over the receiving aperture.

In a ninety-fourth aspect, in addition to one or more of the preceding or following aspects, or in the alternative to some aspects, the method can further include calculating a number of scaffolds and/or ladders needed for fenestration installation.

In a ninety-fifth aspect, in addition to one or more of the preceding or following aspects, or in the alternative to some aspects, the method can further include identifying at least one of warping, color distortion or irregularities, and out of square conditions of an existing building structure.

In a ninety-sixth aspect, in addition to one or more of the preceding or following aspects, or in the alternative to some aspects, the method can further include issuing an alert or warning to a system user if warping, color distortion or irregularities, or an out of square condition is detected.

In a ninety-seventh aspect, in addition to one or more of the preceding or following aspects, or in the alternative to some aspects, the method can further include initiating review by a specialist or project manager if warping, color distortion or irregularities, or an out of square condition is detected.

In a ninety-eighth aspect, in addition to one or more of the preceding or following aspects, or in the alternative to some aspects, the method can further include identifying an exterior wall material.

In a ninety-ninth aspect, in addition to one or more of the preceding or following aspects, or in the alternative to some aspects, the method can further include initiating review by a specialist or project manager if a predetermined exterior wall material is identified.

In a one hundredth aspect, in addition to one or more of the preceding or following aspects, or in the alternative to some aspects, the method can further include displaying an overlay of measurements on an actual image of a fenestration.

In a one hundred and first aspect, in addition to one or more of the preceding or following aspects, or in the alternative to some aspects, the method can further include storing measured dimensions and/or estimated dimensions for later review off site.

In a one hundred and second aspect, a fenestration replacement system can be included having a control circuit, and a solid object sensor, wherein the solid object sensor is in electrical communication with the control circuit and wherein the fenestration replacement system can be configured to detect physical features of an existing fenestration unit using data from the solid object sensor, and determine one or more characteristics of the existing fenestration unit based on the detected physical features.

In a one hundred and third aspect, in addition to one or more of the preceding or following aspects, or in the alternative to some aspects, the one or more characteristics can include at least one selected from the group consisting of a fenestration type, a fenestration manufacturer, a fenestration model, and a degree of curvature of normally straight components.

In a one hundred and fourth aspect, in addition to one or more of the preceding or following aspects, or in the alternative to some aspects, the fenestration type includes at least one selected from the group consisting of double hung, single hung, casement, awning, gliding, pass-through, picture, and specialty window types.

In a one hundred and fifth aspect, in addition to one or more of the preceding or following aspects, or in the alternative to some aspects, the fenestration type includes a door type.

In a one hundred and sixth aspect, in addition to one or more of the preceding or following aspects, or in the alternative to some aspects, the fenestration replacement system can be configured to estimate one or more dimensions needed for fenestration replacement by applying offset values to measured physical dimensions based on at least one of the fenestration type, the fenestration manufacturer, and the fenestration model.

In a one hundred and seventh aspect, in addition to one or more of the preceding or following aspects, or in the alternative to some aspects, the fenestration replacement system can be configured to execute an exception procedure when a determined degree of curvature exceeds a threshold value.

In a one hundred and eighth aspect, in addition to one or more of the preceding or following aspects, or in the alternative to some aspects, the fenestration replacement system can be configured to issue an alert for a human operator when a determined degree of curvature exceeds a threshold value.

In a one hundred and ninth aspect, in addition to one or more of the preceding or following aspects, or in the alternative to some aspects, the one or more characteristics can include a grill style.

In a one hundred and tenth aspect, in addition to one or more of the preceding or following aspects, or in the alternative to some aspects, the one or more characteristics can include a color of at least one component of the existing fenestration unit.

In a one hundred and eleventh aspect, in addition to one or more of the preceding or following aspects, or in the alternative to some aspects, the physical features can include at least one selected from the group consisting of surfaces, corners, and physical dimensions.

In a one hundred and twelfth aspect, in addition to one or more of the preceding or following aspects, or in the alternative to some aspects, the solid object sensor can include at least one selected from the group consisting of an optical sensor, a LIDAR sensor, a penetrating electromagnetic wave sensor, a thermal imaging sensor, and an X-ray sensor.

In a one hundred and thirteenth aspect, in addition to one or more of the preceding or following aspects, or in the alternative to some aspects, the fenestration replacement system can be configured to interpolate portions of the physical features that are at least partially obscured.

In a one hundred and fourteenth aspect, in addition to one or more of the preceding or following aspects, or in the alternative to some aspects, the fenestration replacement system can be configured to cross-reference dimensions of the existing fenestration unit as measured from an interior side with those as measured from an exterior side.

In a one hundred and fifteenth aspect, in addition to one or more of the preceding or following aspects, or in the alternative to some aspects, the fenestration replacement system can be configured to create a dimensional model for a fenestration unit using detected physical features of the existing building structure.

In a one hundred and sixteenth aspect, in addition to one or more of the preceding or following aspects, or in the alternative to some aspects, the fenestration replacement system can be configured to accept user input regarding the one or more characteristics of the existing fenestration unit.

In a one hundred and seventeenth aspect, in addition to one or more of the preceding or following aspects, or in the alternative to some aspects, the fenestration replacement system can be configured to identify at least one of warping, color distortion or irregularities, and out of square conditions of the existing fenestration unit.

In a one hundred and eighteenth aspect, in addition to one or more of the preceding or following aspects, or in the alternative to some aspects, the fenestration replacement system can be configured to issue an alert or warning to a system user if warping, color distortion or irregularities, or an out of square condition are detected.

In a one hundred and nineteenth aspect, in addition to one or more of the preceding or following aspects, or in the alternative to some aspects, the fenestration replacement system can be configured to initiate review by a specialist or project manager if warping, color distortion or irregularities, or an out of square condition are detected.

In a one hundred and twentieth aspect, in addition to one or more of the preceding or following aspects, or in the alternative to some aspects, the fenestration replacement system can be configured to identify an exterior wall material.

In a one hundred and twenty-first aspect, in addition to one or more of the preceding or following aspects, or in the alternative to some aspects, the fenestration replacement system configured to initiate review by a specialist or project manager if a predetermined exterior wall material is identified.

In a one hundred and twenty-second aspect, in addition to one or more of the preceding or following aspects, or in the alternative to some aspects, the existing fenestration unit can include at least one selected from the group consisting of a window, a patio door, and an entry door.

In a one hundred and twenty-third aspect, a method of gathering data for a fenestration replacement project can be included, the method including detecting physical features of an existing fenestration unit using data from a solid object sensor, and determining one or more characteristics of the existing fenestration unit based on the detected physical features.

In a one hundred and twenty-fourth aspect, in addition to one or more of the preceding or following aspects, or in the alternative to some aspects, the method can further include estimating one or more dimensions needed for fenestration replacement by applying offset values to measured physical dimensions based on at least one of the fenestration type, the fenestration manufacturer, and the fenestration model.

In a one hundred and twenty-fifth aspect, in addition to one or more of the preceding or following aspects, or in the alternative to some aspects, the one or more characteristics of the existing fenestration unit can include at least one selected from the group consisting of a fenestration type, a fenestration manufacturer, a fenestration model, and a degree of curvature of normally straight components.

In a one hundred and twenty-sixth aspect, in addition to one or more of the preceding or following aspects, or in the alternative to some aspects, the method can further include executing an exception procedure when a determined degree of curvature exceeds a threshold value.

In a one hundred and twenty-seventh aspect, in addition to one or more of the preceding or following aspects, or in the alternative to some aspects, the method can further include issuing an alert for a human operator when a determined degree of curvature exceeds a threshold value.

In a one hundred and twenty-eighth aspect, in addition to one or more of the preceding or following aspects, or in the alternative to some aspects, the method can further include interpolating portions of the physical features that are at least partially obscured.

In a one hundred and twenty-ninth aspect, in addition to one or more of the preceding or following aspects, or in the alternative to some aspects, the method can further include cross-referencing dimensions of the existing fenestration unit as measured from an interior side with those as measured from an exterior side.

In a one hundred and thirtieth aspect, in addition to one or more of the preceding or following aspects, or in the alternative to some aspects, the method can further include creating a dimensional model for a fenestration unit using detected physical features of the existing building structure.

In a one hundred and thirty-first aspect, in addition to one or more of the preceding or following aspects, or in the alternative to some aspects, the method can further include accepting user input regarding the one or more characteristics of the existing fenestration unit.

In a one hundred and thirty-second aspect, in addition to one or more of the preceding or following aspects, or in the alternative to some aspects, the method can further include identifying at least one of warping, color distortion or irregularities, and out of square conditions of the existing fenestration unit.

In a one hundred and thirty-third aspect, in addition to one or more of the preceding or following aspects, or in the alternative to some aspects, the method can further include issuing an alert or warning to a system user if warping, color distortion or irregularities, or an out of square condition are detected.

In a one hundred and thirty-fourth aspect, in addition to one or more of the preceding or following aspects, or in the alternative to some aspects, the method can further include initiating review by a specialist or project manager if warping, color distortion or irregularities, or an out of square condition are detected.

In a one hundred and thirty-fifth aspect, in addition to one or more of the preceding or following aspects, or in the alternative to some aspects, the method can further include identifying an exterior wall material.

In a one hundred and thirty-sixth aspect, in addition to one or more of the preceding or following aspects, or in the alternative to some aspects, the method can further include initiating review by a specialist or project manager if a predetermined exterior wall material can be identified.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 8 is a schematic view of a lookup table in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As described above, installing and/or replacing fenestration units requires accurate measurements to be made. However, making such measurements can be a labor-intensive, manual process and, in some scenarios, insufficiently accurate.

Various embodiments herein are directed to a fenestration replacement measuring system that can allow for measurements to be more readily made in an efficient and accurate manner. In some embodiments, the fenestration replacement measuring system can include a control circuit and a solid object sensor. The fenestration replacement measuring system can be configured to detect/identify physical features of an existing fenestration unit using data from the solid object sensor, measure one or more dimensions of the existing fenestration unit using the physical features, and estimate one or more dimensions needed for fenestration replacement using the measured dimensions.

Similarly, various embodiments herein can be directed to a fenestration receiving aperture measuring system that can include a control circuit and a solid object sensor. The fenestration receiving aperture measuring system can be configured to detect/identify physical features of an existing building structure using data from the solid object sensor, measure one or more dimensions of the existing building structure using the detected physical features, and estimate one or more dimensions needed for fenestration installation using the measured dimensions.

In various embodiments herein, a system can be included that can determine one or more characteristics of existing fenestration units. The system can be configured to detect/identify physical features of an existing fenestration unit using data from the solid object sensor and determine one or more characteristics of the existing fenestration unit based on the detected physical features.

Figure 1:
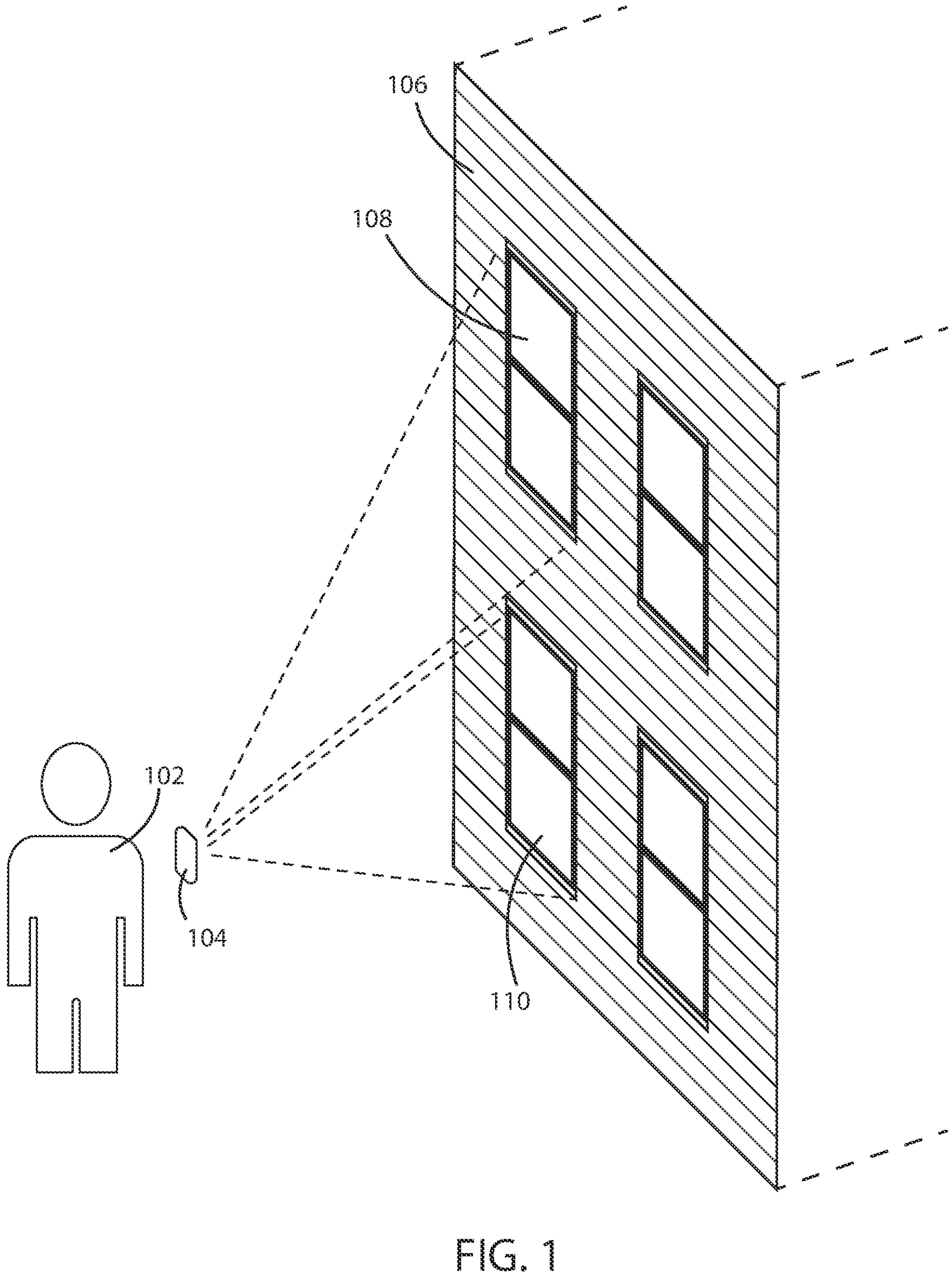
FIG. 1 is a schematic view of a system in accordance with various embodiments herein.

Referring now to FIG. 1, a schematic view of a system is shown in accordance with various embodiments herein. FIG. 1 specially shows a system user 102 along with a building 106 that may be evaluated using a system herein. The building 106, in this example, includes at least a top fenestration unit 108 and a bottom fenestration unit 110. The top fenestration unit 108 may be, for example, on the second floor of the building 106 while the bottom fenestration unit 110 may be on the first floor of the building 106. It will be appreciated that this building 106 just serves as one example and that systems herein can be used to evaluate buildings may include one story, two stories, three stories, or more. A fenestration replacement measuring system herein can include a hand-held unit 104 as part of the system. The system user 102 can interact with the hand-held unit 104 in order to take measurements of the building 106 including fenestrations thereof. However, it will be appreciated that in other embodiments the system may not include a hand-held unit, but instead may include a unit resting on the ground, on a tripod, or on another type of support. In some embodiments, the system may also be mounted on a pole, on a mobile unit such as a drone, or another fixed or mobile mount.

The fenestration replacement measuring system can be configured to detect physical features of an existing fenestration unit 108 or 110 using data from one or more sensors, such as an object sensor. Many different physical features can be detected using such sensors. In various embodiments, the physical features can include at least one including at least one of spatial points, edges, surfaces, and corners. Further details of exemplary sensors are described in greater detail below.

It will be appreciated that in many cases fenestrations may be at a height substantially above grade. For example, windows on a second or third floor of a building will typically be at a substantial height from the ground. This can introduce challenges in making accurate measurements of the existing rough openings and/or fenestrations, particularly where measurements must be made from outside of the building. To address this issue, in various embodiments herein, the fenestration replacement measuring system can be configured to detect physical features of an existing fenestration unit using data from the surface sensor while pointing upward at an angle of at least 15, 30, 45, or 60 degrees relative to a horizontal plane and compensate for the same (such as by using various geometric operations and/or transformations) when estimating one or more dimensions needed for fenestration installation using the measured dimensions.

In some cases fenestrations are made to order based on dimensions of existing rough openings or frames on or in specific buildings. It can be useful to have a dimensional model of the rough opening and/or frame when making replacement fenestrations to fit the same. In various embodiments herein, the fenestration replacement measuring system can be configured to create a dimensional model for a replacement fenestration unit using at least one of the measured one or more dimensions of the existing fenestration unit and the estimated one or more dimensions needed for fenestration replacement. The dimensional model can include physical features of the existing rough opening, existing frame, existing fenestration unit or the like along with dimensions of the same. In some cases, the dimensional model can take the form of a CAD type drawing or other engineering document or file (physical or electronic in various formats such as DWG, DXF, or the like), contextualized data, data attributes, or other data representing the needed fenestration unit or the rough opening or frame into which the fenestration unit will be placed.

Figure 2:
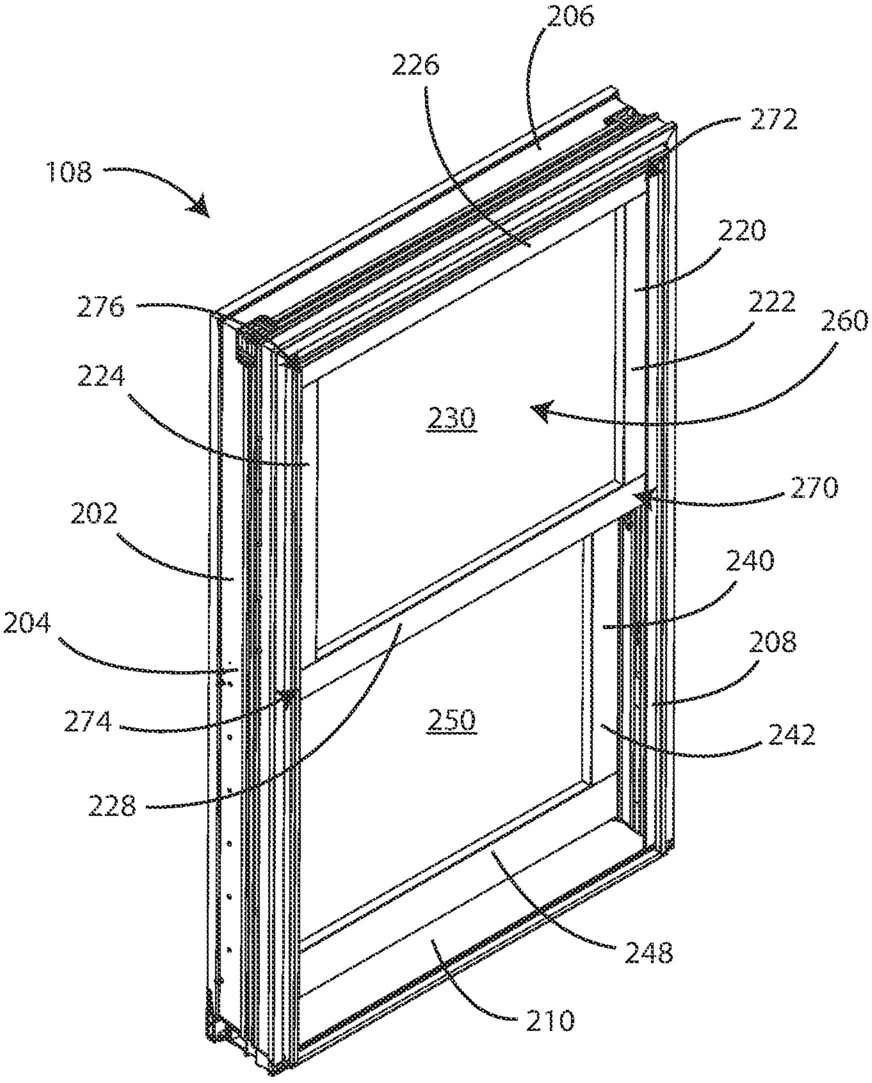
FIG. 2 is a perspective view of a fenestration unit in accordance with various embodiments herein.

Referring now to FIG. 2, a perspective view of a fenestration unit 108 is shown in accordance with various embodiments herein. The illustrated fenestration unit can be consistent with either an existing fenestration unit to be replaced and/or a replacement fenestration unit. Specific fenestration units can have varying features and it will be appreciated that the fenestration unit 108 of FIG. 2 is only provided as an example showing some features amongst many different possibilities.

In this example, the fenestration unit 108 includes a frame assembly 202. The frame assembly 202 includes a first side jamb 204, a head jamb 206, a second side jamb 208, and a sill 210. In various embodiments the first side jamb 204, head jamb 206, second side jamb 208, and sill. Any of these features can be identified and measurements can be made and/or dimensions can be estimated by embodiments of systems herein. In the example of FIG. 2, the fenestration unit 108 is a window and, specifically, a double-hung window. However, it will be appreciated that various features described herein can also be identified with respect to other types of windows as well as doors, such as patio doors.

The fenestration unit 108 shown in FIG. 2 includes a top sash 220. The top sash 220 includes a first stile 222, a second stile 224, a top rail 226, and a check rail 228. The top sash 220 forms a first lower corner 270, a first upper corner 272, a second lower corner 274, and a second upper corner 276. Any of these features can be identified and measurements can be made and/or dimensions can be estimated by embodiments of systems herein. In some embodiments, the system can be used to measure not only sash sizes, but sash size ratios too, such as the size ratio of the top sash 220 to the bottom sash 240.

In various embodiments the first stile 222, second stile 224, top rail 226, and check rail 228 can be lineal extrusions. In the context of a double-hung window, the top sash 220 can slide up and down within the frame assembly 202. The top sash 220 includes a glass subassembly 230 therein. Any of these features can be identified and measurements can be made and/or dimensions can be estimated by embodiments of systems herein.

The fenestration unit 108 also includes a bottom sash 240. The bottom sash 240 includes a first stile 242 and a second stile (not shown in this view). The bottom sash 240 also includes a bottom rail 248 and a check rail (not shown in this view). In various embodiments, the bottom rail 248 of the bottom sash 240 can be taller than the other rails, such as those of the top sash 220, and is sometimes referred to as a "tall bottom rail". The bottom sash 240 also includes a glass subassembly 250. Any of these features can be identified and measurements can be made and/or dimensions can be estimated by embodiments of systems herein.

In some cases, fenestrations may have screens on them. In some embodiments, the system can detect the presence of a screen and take a responsive action to ensure accuracy of measurements despite the presence of the screen. In some cases, a responsive action can include prompting a system user to remove the screen. In some cases, the responsive action can include engaging a screen-noise processing mode. The screen-mode processing mode can include executing processing operations herein while applying processing models appropriate for the presence of a screen. For example, in some embodiments, the system can apply offset values when making measurements that are appropriate for accurate measurements in the presence of a screen. In some embodiments herein, such as in scenarios where a pattern matching algorithm is used to identify some aspect of a fenestration, then the templates matched against can include templates representing fenestrations with screens in place. In some embodiments, points (such as from a point cloud) associated with the screen (such as points within a specific plane associated with the screen) can be excluded from use in various operations herein.

Figure 3:
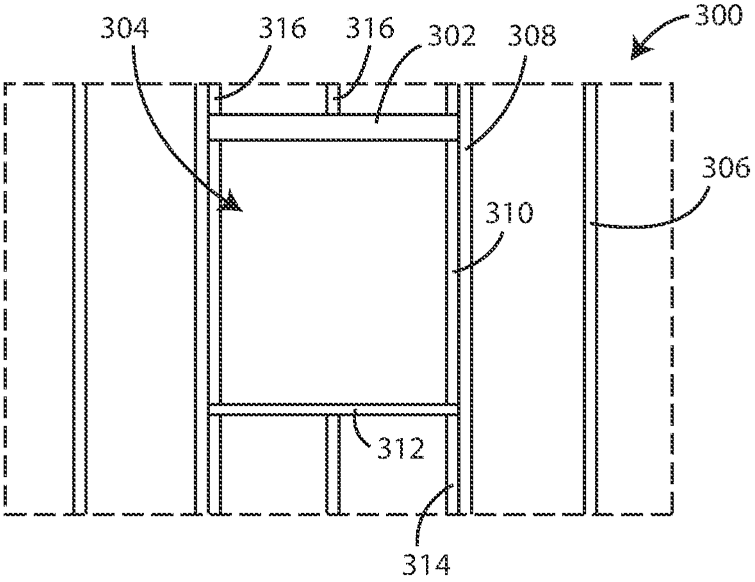
FIG. 3 is a schematic view of a rough opening in a wall in accordance with various embodiments herein.

In many cases, fenestrations may be inserted into a rough opening of a wall. Therefore, the dimensions of the rough opening can be important to determine in order to correctly size a fenestration unit to be inserted into the same. Referring now to FIG. 3, a schematic view of a rough opening 304 in a wall 300 is shown in accordance with various embodiments herein. The wall 300 defines a rough opening 304. The wall 300 includes various framing elements that form the wall and the rough opening 304. For example, the wall 300 includes wall studs 306. The wall 300 also includes a king stud 308 that is adjacent the rough opening 304. The wall 300 also includes trimmer studs 310 which may define the sides of the rough opening 304. The wall 300 also includes a sill 312 and a header 302 defining the bottom and the top, respectively, of the rough opening 304. The wall 300 also includes bottom cripple studs 314 and top cripple studs 316.

Figure 4:
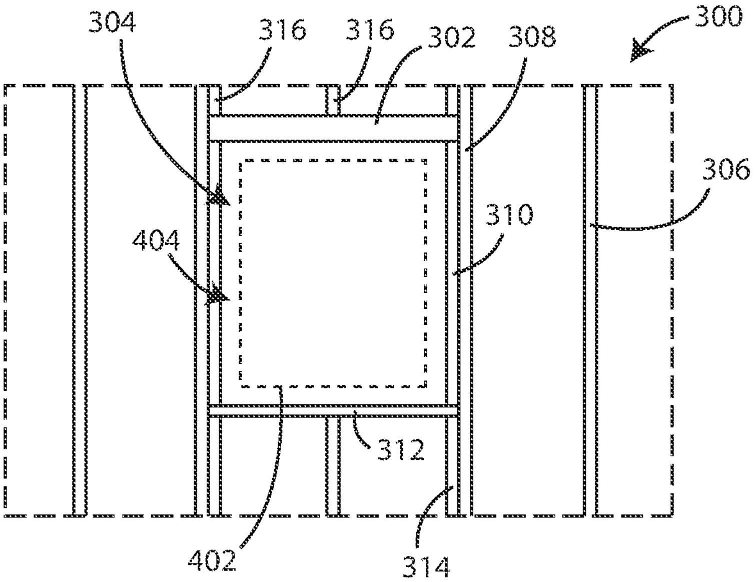
FIG. 4 is a schematic view of a rough opening in a wall in accordance with various embodiments herein.

Generally, there is a small gap between the outside perimeter of the fenestration unit and the interior perimeter of the rough opening. Referring now to FIG. 4, a schematic view of a rough opening 304 in a wall 300 is shown in accordance with various embodiments herein. FIG. 4 is generally similar to FIG. 3, however, a window position 402 is superimposed illustrating an exemplary gap 404 (gap between the outside perimeter of the fenestration unit and the interior perimeter of the rough opening). The size of the clearance gap (or rough opening offset) can vary, but in some scenarios it can be about 0, 0.1, 0.25, 0.5, 1, 1.5, 2, 2.5, or 3 inches, or an amount falling within a range between any of the foregoing. It will be appreciated that the gap 404 does not remain empty after fenestration installation, but rather components such as shims, fastener structures, insulation, and other materials may fill parts of the gap.

Various specific dimensions may be needed for fenestration replacement. Dimensions can be measured and/or estimated herein can include any dimensions of any of the physical components discussed herein along with other components of fenestrations and/or openings to receive the same. In various embodiments, the one or more dimensions needed for fenestration replacement can specifically include at least one of a rough opening 304 size and an existing frame size. Systems herein can be used to provide measurements for the needed dimensions.

While FIGS. 3 and 4 illustrate a rough opening of a wall, it will be appreciated that in various scenarios an existing frame may be retained and a replacement fenestration unit may be mounted within the existing frame. This scenario is sometimes referred to as a "frame insert" or "insert installation" scenario. As such, in various embodiments herein, the dimensions of the existing frame can be measured using techniques described herein.

Figure 5:
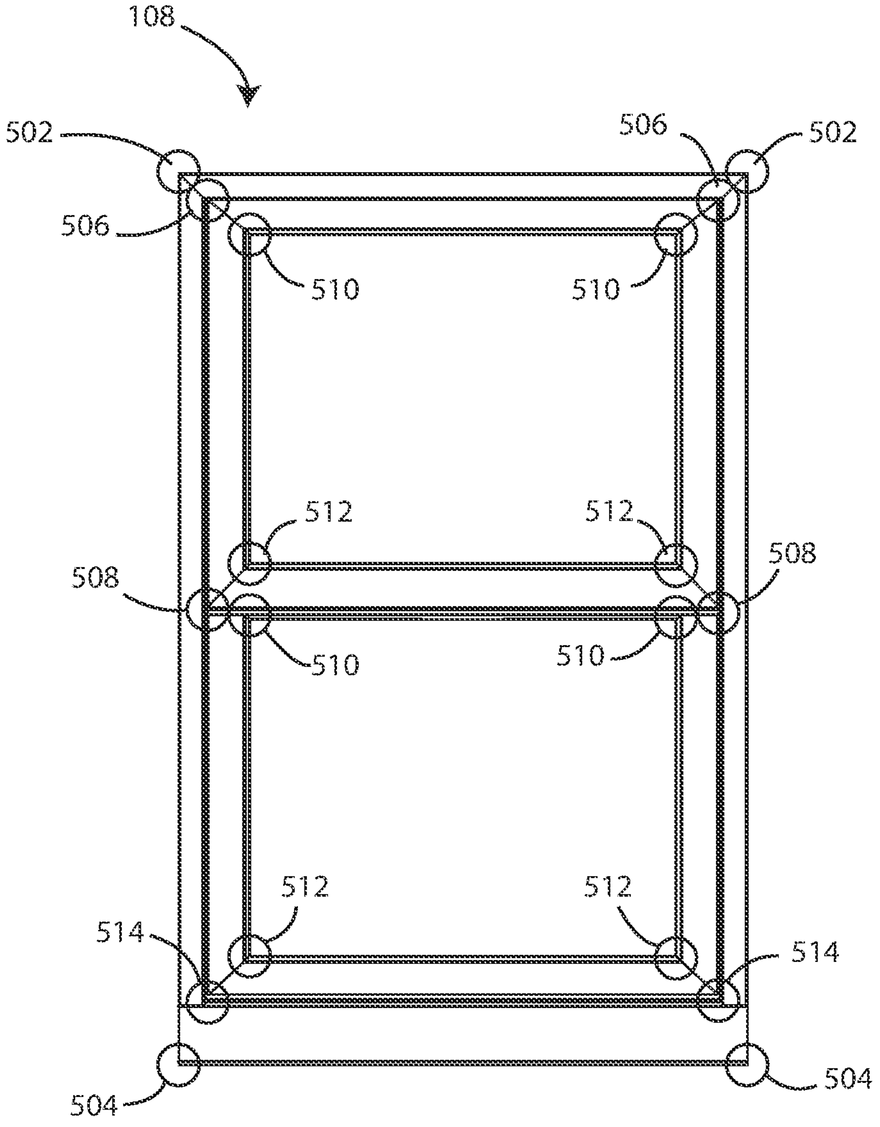
FIG. 5 is a schematic measurement view of a fenestration unit in accordance with various embodiments herein.

In some embodiments, systems herein can detect and/or measure various physical features. The physical features can be identified using data from sensors of the system and/or sensors in communication with the system. In some cases the physical features can include at least one of spatial points, edges, surfaces, and corners. Referring now to FIG. 5, a schematic measurement view of a fenestration unit 108 is shown in accordance with various embodiments herein. In this example, the measurement system can determine the position of various corners or intersections of components. The corners can include a frame outer top corner 502, a sill outer bottom corner 504, a sash outer top corner 506, a top sash outer bottom corner 508, a sash inner top corner 510, a sash inner bottom corner 512, and a bottom sash outer bottom corner 514.

In various embodiments, the fenestration replacement measuring system can automatically determine the position of physical features. However, in various embodiments, the fenestration replacement measuring system can also be configured to accept user input regarding the physical features and/or incorporate the user input when generating a measurement of the existing fenestration unit or an estimate of the dimensions needed for a fenestration replacement. In various embodiments, the fenestration replacement measuring system can be configured to accept user input regarding the physical features and store the same. In various embodiments, the system can be configured to accept user input regarding the position of features such as corners, edges, points, surfaces, or the like. This can be done in various ways. In some embodiments, the system can be configured so that the user can directly touch certain points (or "pick points") that may correspond to a feature and move them on the screen, such as to enhance the positioning accuracy of the same. In some embodiments, the user input can be accepted as provided by a user that is at the same site as the fenestration unit being measured. However, in some embodiments, the user input can be accepted from a remote user (such as an expert user) that is remote from the site of the fenestration unit being measured. For example, the system can transmit data to a remote site sufficient to show a user at the remote site an image of the fenestration unit along with features and/or measurements of the same. The remote user can then provide input on the same such as through a computing device at the remote site and this input can then be conveyed to the system for processing through a data network. For example, the remote user could specify a change in the position of pick points. In this manner, the expertise of a remote user can be leveraged to enhance the accuracy of measurements made by the system while not requiring the remote user to actually travel to the site of the fenestration saving time and expense.

The system can measure dimensions with great accuracy. In various embodiments, the one or more dimensions are measured with an accuracy of within 1 inch at a distance of 20 feet. In various embodiments, the one or more dimensions are measured with an accuracy of within ½ inch at a distance of 20 feet. In various embodiments, the one or more dimensions are measured with an accuracy of within ¼ inch at a distance of 20 feet. In various embodiments, the one or more dimensions are measured with an accuracy of within ⅛ inch at a distance of 20 feet. In various embodiments, the one or more dimensions are measured with an accuracy of within 1/16 inch at a distance of 10 feet.

In various embodiments, the fenestration replacement measuring system can also be configured to detect physical features of a replacement fenestration unit (such as after installation thereof) using data from the object sensor and measure one or more dimensions of the replacement fenestration unit using the physical features.

In some embodiments, the object sensor can take the form of a solid object sensor. In some embodiments, the object sensor can take the form of an optical sensor. In some embodiments, the object sensor can take the form of another type of sensor, such as a LIDAR system.

In some embodiments, systems herein can include multiple object sensors. For example, the system can include multiple object sensors of the same or different types. In some embodiments, the system can use multiple object sensors and then compare data from the same in order to produce data with enhanced accuracy through an error correction operation. In some embodiments, the system can use operations of averaging, consensus, and/or threshold evaluation in order to combine the data from multiple sensors and enhance the accuracy of measurements and/or estimations derived therefrom. The use of multiple sensors can enable computer stereo vision techniques in accordance with various embodiments herein.

Optical sensors herein can include, but are not limited to, point sensors, distributed sensors, extrinsic sensors, intrinsic sensors, diffuse reflective sensors, retro-reflective sensors, through beam sensors, and the like. An example of a specific optical sensor herein can include a camera responsive to various light frequencies including, for example, the visible light spectrum, the infrared light spectrum, and the like. In many cases, the optical sensor can include an optical detector or receiver. In some cases, the optical sensor can also include an optical emitter. Optical sensors herein can generate data reflecting an image (image data), such as a raster image including a fenestration. Various operations can be performed on the image data. For example, various image processing operations can be performed on the image data. In some embodiments, an edge detection algorithm can be executed in order to identify visual edges corresponding to physical object edges within the image data. In many cases, edge detection algorithms herein can identify edges at which the image brightness and/or color changes sharply or otherwise exhibits discontinuities. In some embodiments, a Canny edge detector algorithm can be executed on the image data in order to identify edges therein. Various specific sub-operations can be performed as part of an implementation of a Canny edge detector algorithm. In some embodiments, a sub-operation of applying a Gaussian filter can be used to filter out noise within the image data. In some embodiments, a sub-operation of finding the intensity gradient within the image data can be performed. Various operators can be used to estimate image gradient including, for example, the Sobel operator, the Prewitt operator, the Roberts cross, the Kayyali operator, and the Frei-Chen operator. In some embodiments, a sub-operation of gradient magnitude thresholding and/or lower bound cut-off suppression can be performed. In some embodiments, a sub-operation of filtering out pixels with a weak gradient value can be performed. This can be performed, for example, by evaluating remaining pixels against a high threshold value and/or a low threshold value. In some embodiments, a sub-operation of hysteresis can be performed to remove weak edges and/or weak edge pixels. Various other edge detection algorithms can also be used herein.

In some embodiments, a corner detection algorithm can be executed in order to identify visual corners corresponding to physical object corners within the image data. In some embodiments, corner detection can be executed after edge detection. However, in some embodiments corner detection can be executed in the absence of edge detection. In embodiments where edge detection is performed, corner detection can include identifying all intersections of identified edges and/or edge terminal points. Intersections can be identified by identifying all points representing pixels that are part of more than one edge and/or pixels from at least two edges that are adjacent and/or within a threshold distance of one another.

In some embodiments, the sensor(s) can take the form of a LIDAR (light detection and ranging) system. LIDAR systems herein typically work by emitting pulsed light waves that bounce off of objects and then return to the sensor. In various embodiments, the emitter can include a laser operating at various frequencies, including 600 nm to 1000 nm wavelength lasers as merely one example. The sensor, and/or a processing unit in communication therewith, then uses the timing of returned pulses to calculate the distance to specific points within the field of the LIDAR emissions. LIDAR emitters herein can produce hundreds of thousands of pulses per second. In some embodiments, the data from a LIDAR system can take the form of a point cloud with each point in the point cloud reflecting specific coordinates, such as X, Y, Z coordinates.

Figure 6:
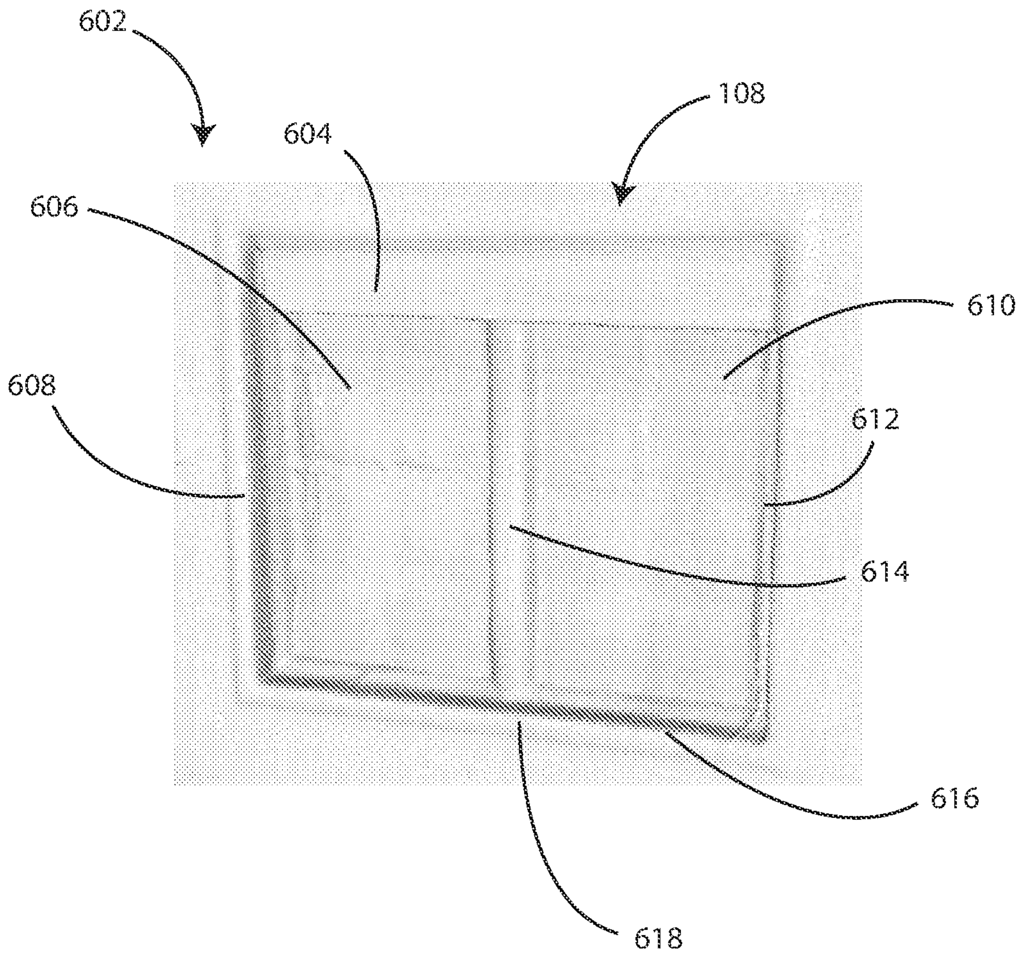
FIG. 6 is a schematic point cloud view of a fenestration unit in accordance with various embodiments herein.

Referring now to FIG. 6, a schematic point cloud 602 view of a fenestration unit is shown in accordance with various embodiments herein. The point cloud 602 identifies various physical features of the fenestration unit 108. For example, the point cloud 602 elucidates a frame top 604, a first sash surface 606, a first side jamb 608, a second sash surface 610, a second side jamb 612, a mullion 614, a sill plate 616, and a frame bottom 618.

In various embodiments, the physical features identifiable with the point cloud 602 can include those described elsewhere herein including, but not limited to, at least one including at least one of spatial points, edges, surfaces, and corners. In various embodiments, the physical features identifiable with the point cloud 602 can include corners within the same plane.

In some embodiments, systems herein can execute various operations on point cloud data. By way of example, in some embodiments, the system can execute an operation of point cloud segmentation and/or classifying point clouds into multiple homogeneous regions, including, for example identifying surfaces and/or corners of objects represented within the point cloud. In some embodiments, point cloud segmentation and/or feature identification can be performed by the system herein by executing operations including, but not limited to, convex decomposition, watershed analysis, hierarchical clustering, region growing, and/or spectral clustering.

It will be appreciated that various other techniques of acquiring image data and/or point data to be used to identify features of fenestrations are also contemplated herein including, but not limited to, other sensing techniques based on electromagnetic waves, X-rays, sonic waves and/or pressure waves, thermal sensing systems, electrical property sensing systems, and the like.

Figure 7:
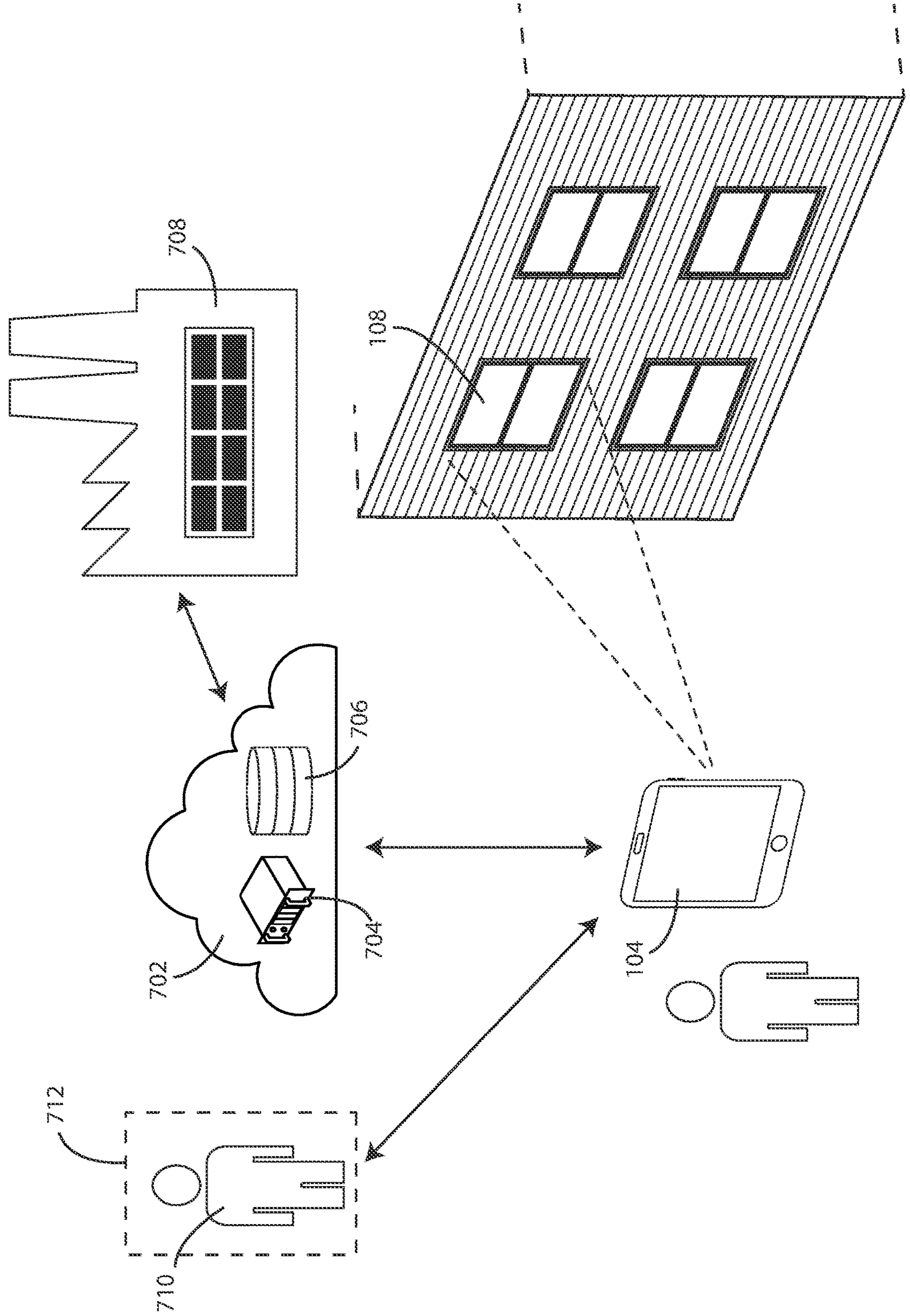
FIG. 7 is a schematic view of data flow between components of a system in accordance with various embodiments herein.

Embodiments of the system described herein can include various components and data and/or signals can flow back and forth between such components. Referring now to FIG. 7, a schematic view of data flow between components of a system herein is shown in accordance with various embodiments. The system can include a hand-held unit 104. The hand-held unit 104 can exchange data with computing components such as computing components within the cloud 702 or otherwise accessible through a data network. In this example, the cloud 702 can include various components including, but not limited to, a server 704 and a database 706. FIG. 7 also shows a factory 708 where fenestration units can be manufactured to order. In various embodiments, components of the system such as components within the cloud 702 and/or a hand-held unit 104 can exchange data with the factory 708. Operations described herein can be executed by various components. In some embodiments, operations herein can be executed by the hand-held unit 104 or other unit that is within the field. In some embodiments, operations herein can be executed by a computing resource that is remote from the field, such as a computing resource (such as a server, either real or virtual) within the cloud or otherwise accessed through a data network. In some embodiments, operations herein can performed by and/or distributed across multiple devices or systems.

In some embodiments, systems herein can convey information to a party 710 that is at an offsite location 712, such as conveying information in real-time. The party 710 can be a specialist, project manager, or another individual that is at the offsite location 712. Such information conveyed can include all of the information described herein including measurement information. In some embodiments, conveying information to the party 710 can occur in response a warning or alert by the system, or as a part of exception procedure as initiated as described elsewhere herein. Communication with the party 710 can be two-way so that the party 710 can provide input from the offsite location 712.

In some embodiments, systems herein can store measurements of fenestrations, frames, rough openings and the like for a term extending beyond the fenestration replacement and/or installation project. By way of example, in some embodiments, systems herein can store measurements and/or sensor data related to fenestrations long term for purpose of tracking applicable accessories, replacement parts, facilitating product service projects, or the like.

In some embodiments, an order system may be used to track specific fenestration project orders. In some embodiments measurements made with systems herein can be directly transferred to an order system to preserve data integrity. In some embodiments measurements made with systems herein and/or the underlying data from which measurements are made and/or images of fenestrations to be replaced and/or images of fenestrations that are installed can be stored and reprocessed later, such as remeasured later or reevaluated later, to check accuracy, determine a version of product installed, check profiles, and the like such as to facilitate product service scenarios. Thus, in some embodiments, the system can be configured to retrieve data from a stored dataset regarding a fenestration and present information regarding the same to a system user and/or receive input from a system user regarding the same.

Physical features relevant for fenestration replacement and/or installation may not always be within view. For example, structural wall components forming the rough opening of a wall are typically hidden from view in the case of an existing fenestration by siding, trim, or other building components. Therefore, in various embodiments, the fenestration replacement system can be configured to estimate one or more dimensions needed for fenestration replacement by applying offset values to measured physical dimensions based on at least one of the fenestration type, the fenestration manufacturer, and the fenestration model. As an example, the system can apply one or more offset values to those measurements which can be directly observed or measured in order to result in estimations of measurements for those things that cannot be direction observed or measured. In some embodiments, a set of offset values can be stored by the system and referenced in order to convert from measurements that are directly observable to those that are not directly observable. Referring now to FIG. 8, a schematic view of a lookup table 802 is shown in accordance with various embodiments herein. The lookup table 802 (or a database) can be used to provide offset values to be used by the system. Offset values can include various offsets (e.g., “A”, “B”, “C”, etc.) in order to convert from one type of measurement to another. For example, the offset values can be used to convert from a frame measurement to a rough opening measurement, or a sash measurement to a frame measurement, or the like. To increase accuracy, offset values can be indexed by fenestration manufacturer (make), fenestration model, and/or other identifying parameters such as fenestration type, fenestration geolocation, and the like. As such, in some embodiments, the system can determine (independently or through user input) one or more characteristics of existing fenestrations (make, model, etc.) which can then be used to select the correct offset values for use within the lookup table or database.

In various embodiments, the system can accept user input or various types. For example, the system can accept user input regarding dimensions of various features and/or corrections to estimated values of dimensions of various features. In some cases, this can reflect a difference between what might be measured manually by the system operator and what is determined by the system itself. Such data can be stored by the system can then used in various operations. By way of example, in various embodiments, the fenestration replacement measuring system can be configured to use stored user input as part of a training data set in a supervised machine learning operation to generate a machine learning model for dimension estimation. In some embodiments, the user input and/or the machine learning model for dimension estimation can be used to update and/or modify offset values in the lookup table 802. Various machine learning models can be applied herein. Exemplary supervised machine learning models can include, but are not limited to linear regression models, logistic regression models, random forest methods, gradient boosted tree methods, support vector machines (SVM), decision trees, naïve Bayes methods, ensemble methods, and the like. In some embodiments, unsupervised machine learning approaches can also be used.

In some cases, physical features relevant for fenestration replacement and/or installation may not be within view based on where the unit of the system making the measurements is located with respect to the fenestration(s). For example, if the unit of the system making the measurements is at the ground floor of the building and the fenestration location is on the second floor the then unit may be “looking” at an upward angle creating some areas that are hidden from view. Embodiments herein can be configured to interpolate such hidden portions based on those portions that are visible.

Figure 9:
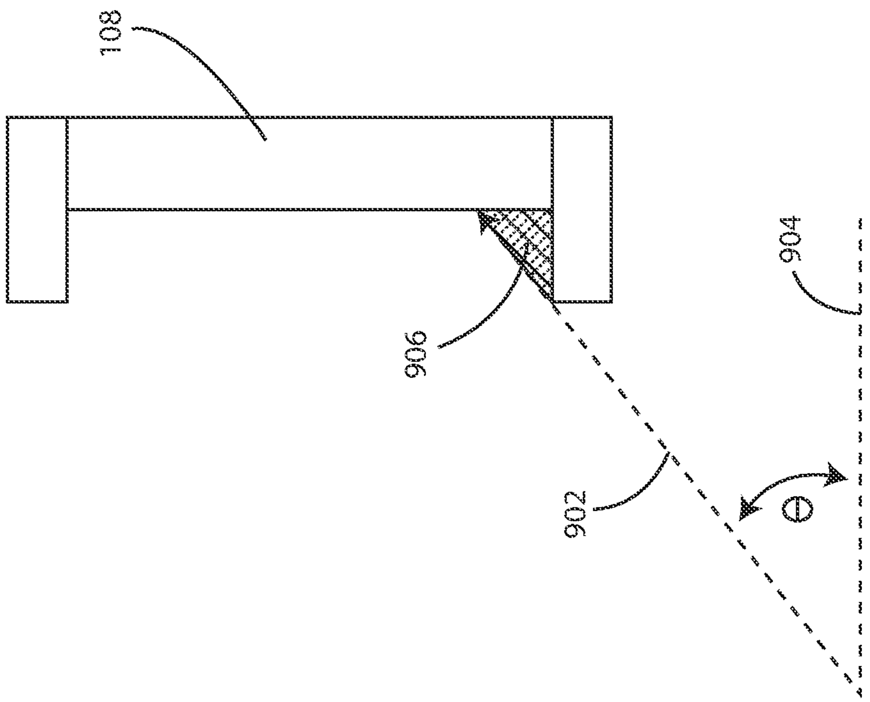
FIG. 9 is a schematic side view of a fenestration unit in accordance with various embodiments herein.

Referring now to FIG. 9, a schematic side view of a fenestration unit 108 is shown in accordance with various embodiments herein. FIG. 9 also shows a horizontal plane 904 along with a line of view 902 of the same. The fenestration unit 108 includes a hidden (or obscured) portion 906 which is not visible based on the line of view 902.

In various embodiments, the fenestration replacement measuring system can be configured to interpolate portions of the physical features that are at least partially obscured. In various embodiments, the physical features that are at least partially obscured are located adjacent the sill of the existing fenestration unit. Interpolation herein can include operations of extending surfaces as identified with sensors herein. For example, point clouds reflecting a surface that ends can be extended by creating virtual points within the same plane.

In some embodiments, it is believed that the accuracy of measurements can be improved by measuring from both the outside of a building as well as the inside of a building. For example, the values obtained from the outside can be compared with the values obtained from the inside and the difference between the same can be computed. Thus, in various embodiments, the fenestration replacement measuring system can be configured to cross-reference dimensions of the existing fenestration unit as measured from an interior side with those as measured from an exterior side. In some embodiments, measurements taken from these two different perspectives can be subjected to operations including averaging, merging, consensus analysis, and the like in order to generate a single set of measurements with enhanced accuracy. In some embodiments, a virtual marker can be used to aid in aligning data taken from these two different perspectives. For example, the center (vertical and horizontal) of each sash that is visible can be identified and used as a virtual marker in order to aid in alignment and/or cross-referencing dimensions of the existing fenestration unit as measured from an interior side with those as measured from an exterior side. In some embodiments, a real or physical marker can be used to aid in alignment and/or cross-referencing dimensions of the existing fenestration unit as measured from an interior side with those as measured from an exterior side. For example, a temporary sticker (such as a sticker on a glass pane) or other marking that is visible from both the interior side and the exterior side can be placed on a portion of the fenestration and can be used to aid in aligning sensor data as taken from both sides.

Figure 10:
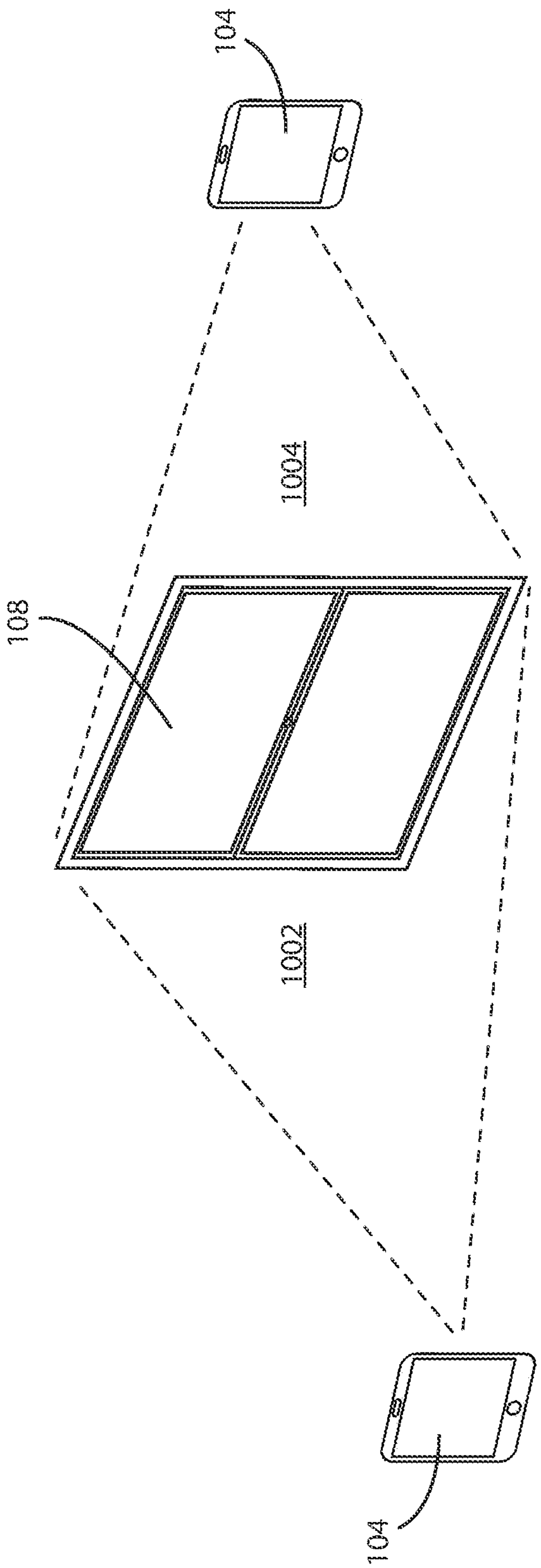
FIG. 10 is a schematic view of portions of a system in accordance with various embodiments herein.

Referring now to FIG. 10, a schematic view of portions of a system is shown in accordance with various embodiments herein. FIG. 10 shows an exterior side 1002 of a fenestration unit 108 being measured with a hand-held unit 104 as well as an interior side 1004 of the fenestration unit 108 being measured with hand-held unit 104. The fenestration replacement measuring system can be configured to cross-reference dimensions of the existing fenestration unit as measured from an interior side 1004 with those as measured from an exterior side 1002. In various embodiments, the fenestration receiving aperture measuring system can be configured to cross-reference dimensions of the existing fenestration unit as measured from an interior side 1004 with those as measured from an exterior side 1002 using one or more virtual markers. In some embodiments, differences can be calculated regarding measurements as derived from the interior side 1004 and measurements as derived from the exterior side 1002. If the difference is below a threshold value, then this can increase the confidence that the measurements are accurate. However, if the difference is above a threshold value, then this can indicate possible problems with the measurements. This can be indicated to a system user, such as through an alert or warning displayed on a user interface. This can also result in the system undertaking an exception procedure such as those described elsewhere herein.

It will be appreciated that the installation and/or replacement of a fenestration unit may require specific equipment. In the context of a fenestration that is significantly above grade, it may require the use of equipment such as one or more ladders or scaffolding units to facilitate work to install and/or replace the fenestration unit. It can be important to determine this early on in the process so that sufficient number of equipment can be brought to the work site. Embodiments herein can help to estimate the amount of equipment needed for a particular fenestration installation and/or replacement job. In some embodiments, the system can calculate the number of pieces of equipment needed and display the same to a system user and/or save information regarding the same such as part of a work order.

Figure 11:
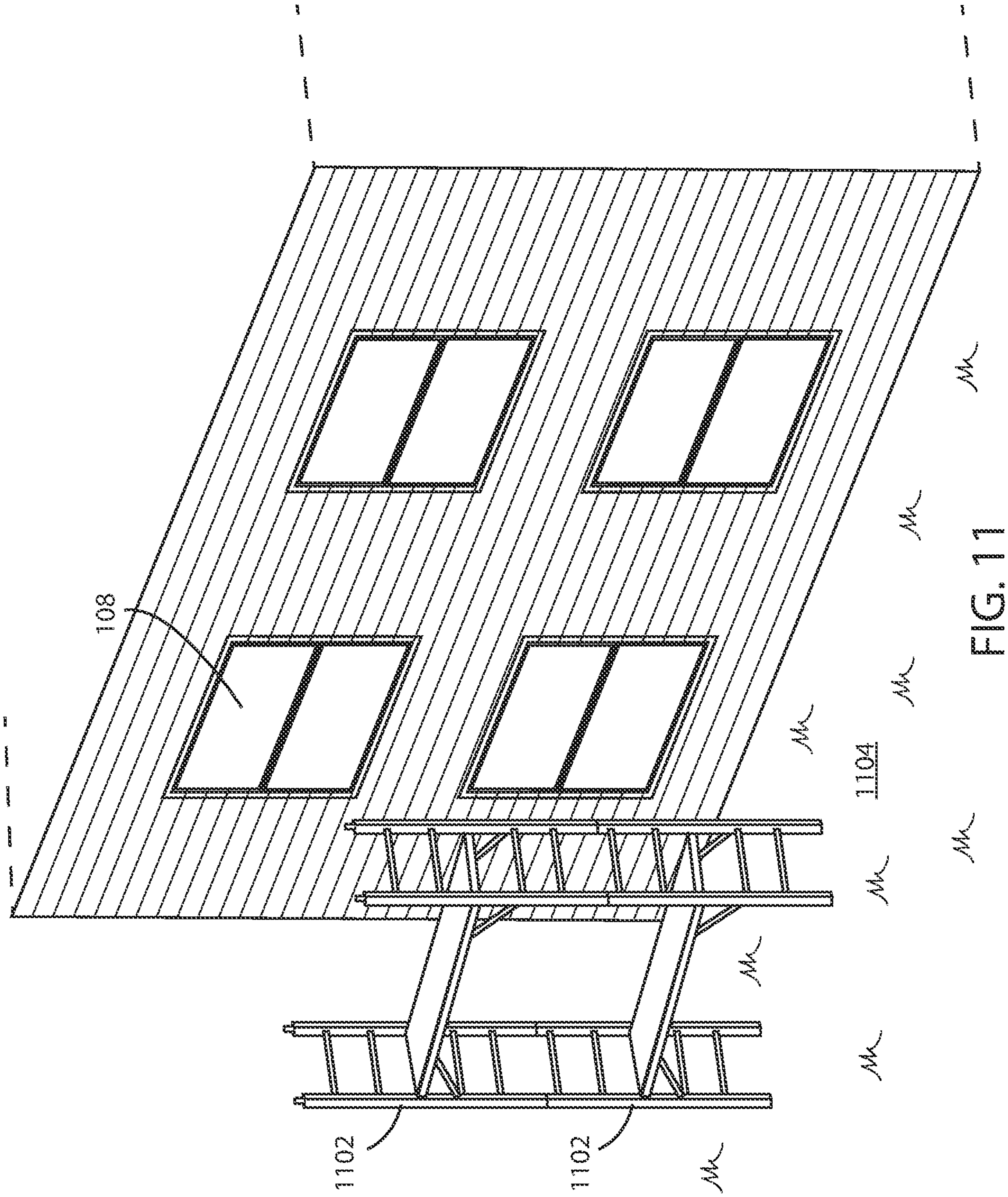
FIG. 11 is a schematic view of portions of a work site in accordance with various embodiments herein.

Referring now to FIG. 11, a schematic view of portions of a work site is shown in accordance with various embodiments herein. In this example, a top fenestration unit 108 is to be replaced. In order to reach the fenestration unit 108, scaffolding units 1102 must be used. In this particular example, at least two scaffolding units 1102 must be used in order to reach the height of the fenestration unit 108. By determining a height of the fenestration unit 108, the system can calculate the required number of scaffolding units 1102 or other structure that are required for the job. For example, each scaffolding unit may be able to safely enable work to a height of 8 feet from grade (if the scaffolding unit is on the bottom) or 8 feet over an underlying scaffolding unit. If the system estimates that the fenestration unit starts at approximately 14 feet above grade then the system can determine that at least two scaffolding units must be used. As such, in various embodiments, the fenestration replacement measuring system can be configured to calculate a number of scaffold units and/or ladders needed to replace the existing fenestration unit. In some embodiments, a similar approach can be used to calculate the amounts of tools and other resources needed to perform the project such as the amounts of tarps, plastic sheeting, sealants, fasteners, flashing tape, backer rod, trim board lengths, and the like. In some embodiments, these amounts can be calculated as a function of the unit(s) and/or height(s) and length(s) thereof that will be installed as part of the project.

In some embodiments, systems herein can also capture data regarding the project site area 1104. For example, systems herein can capture dimensions of the grounds around the structure to determine if there is room for a dumpster or other refuse container needed for old fenestrations that are removed or other waste materials from the project. The system can compare the dimensions of the grounds against a set size or standard sizes for a dumpster and indicate for a system user whether or not there is sufficient room and what size dumpster will fit and/or can store information regarding the same. Similarly, in some embodiments, systems herein can capture images and/or dimensions of the project site (and/or can receive related information such as satellite image data, such as through an API) so that aspects can be evaluated such as whether there is sufficient parking room for construction vehicles and/or trailers at the project site off of the street or whether on-street parking and possible associated permitting needs to be addressed.

Figure 12:
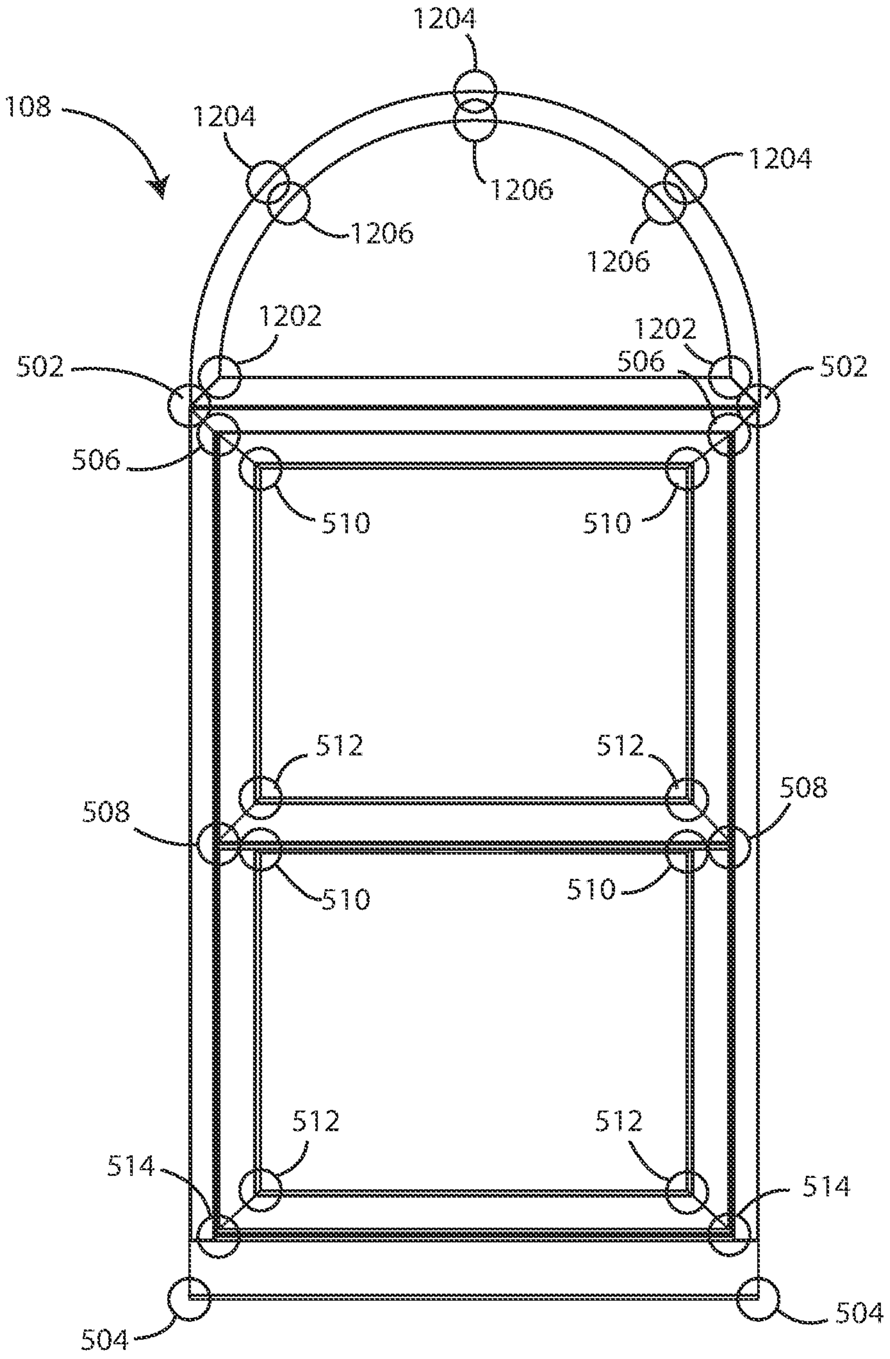
FIG. 12 is a schematic measurement view of a fenestration unit in accordance with various embodiments herein.

In various embodiments, systems herein can also be used to measure curved portions of a fenestrations. Referring now to FIG. 12, a schematic measurement view of a fenestration unit 108 is shown in accordance with various embodiments herein. As described with respect to FIG. 5, the measurement points can include a framer outer top corner 502, a sill outer bottom corner 504, a sash outer top corner 506, a top sash outer bottom corner 508, a sash inner top corner 510, a sash inner bottom corner 512, and a bottom sash outer bottom corner 514. However, the system can also identify measurement points associated with curved features of the fenestration unit 108 including, a curved element inner corner 1202, an outer curvature point 1204, and an inner curvature point 1206, amongst others.

In some scenarios, portions of an existing structure can degrade, warp, and other otherwise deform. This can be important to determine when planning for replacement fenestration units as such degradation, warping, bowing, or other deformation can make it difficult or impossible to place fenestrations within an existing rough opening. In some embodiments, work to the wall itself may be required first before fenestration replacement can be performed. It is important to determine whether or not such work may be required early in the fenestration replacement process. Systems herein can be used in order to help make such determinations. For example, systems herein can be used to detect characteristics of fenestrations including the curvature of components that should normally be straight which may serve as an indicator of an issue with degradation, warping, or other deformation.

Figure 13:
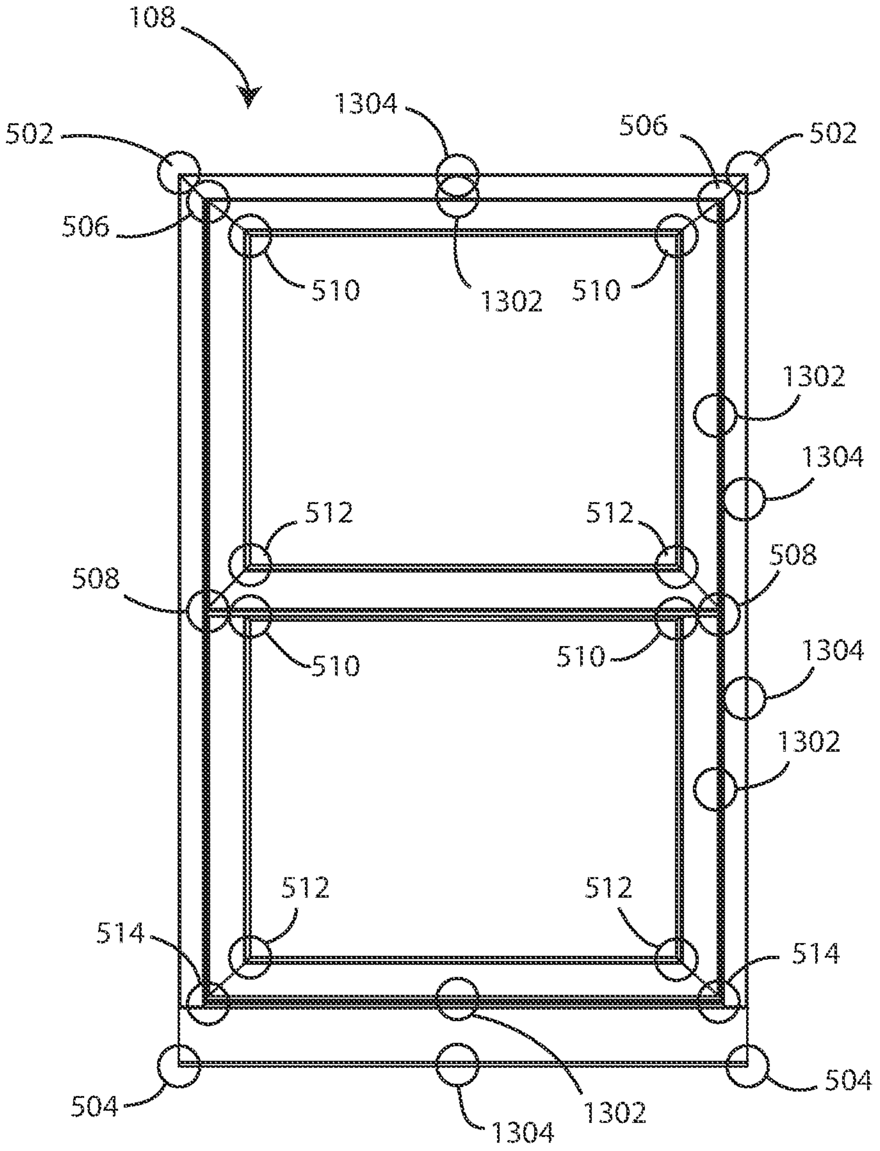
FIG. 13 is a schematic measurement view of a fenestration unit in accordance with various embodiments herein.

Referring now to FIG. 13, a schematic measurement view of a fenestration unit 108 is shown in accordance with various embodiments herein. FIG. 13 is generally similar to FIG. 5. However, in FIG. 13, the measured points also include an inner straight portion edge 1302 and an outer straight portion edge 1304. Straightness can be determined by comparing the position of 1302 and 1304 versus points such as 502, 504, 506, and 514.

In various embodiments, the fenestration replacement system can be configured to execute an exception procedure when a determined degree of curvature exceeds a threshold value. For example, the system can execute an exception procedure when the degree of curvature is greater than 1, 2, 3, 4, 5, 6, 7, or 8 degrees or more as measured with respect to the deviation from a straight line. In some embodiments, the radius of curvature of the normally straight portion of the fenestration unit can be calculated and an exception procedure can be executed if it crosses a threshold value.

In various embodiments, the system can take measurements of specific dimensions and/or compare specific dimensions to detect a condition indicating potential degradation, warping, bowing, or other deformation. By way of example, many portions of a fenestration and/or rough opening can be rectangular and, as such, would be expected to have dimensions that are the same at various locations thereof. Specifically, the top, middle, and bottom of a frame assembly or a sash would typically be expected to have the same width. However, if the width is different in the middle versus the top and the bottom, this can indicate that bowing has occurred which can present challenges to be addressed for fenestration replacement. As such, in some embodiments the system herein can be configured to take measurements at more than one place that are expected to be the same and then compare the measurements to detect a possible issue and flag the same and/or issue an alert for a system user. For example, in some embodiments the system can automatically detect three horizontal dimensions with one representing a midpoint and then compare the same to detect bow or belly.

Figure 14:
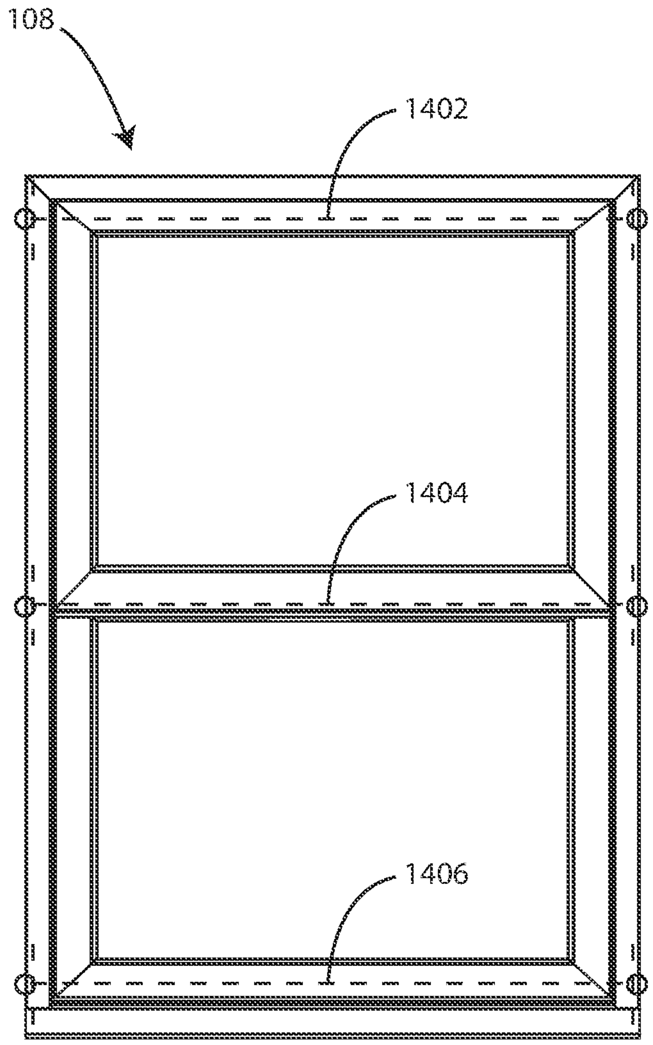
FIG. 14 shows example measurements of a fenestration unit in accordance with various embodiments herein.

Referring now to FIG. 14, example measurements of a fenestration unit 108 are shown in accordance with various embodiments herein. The example measurements as taken using the system herein include a top width 1402, a middle width 1404, and a bottom width 1406. For example, the system can be configured to automatically take such measurements. The top width 1402 can be measured at a point that is at the very top or adjacent thereto, such as within the top 10% of the vertical height of the unit. The bottom width 1406 can be measured at a point that is at the very bottom or adjacent thereto, such as within the bottom 10% of the vertical height of the unit. The middle width 1404 can be between the top and the bottom, such as within the middle 50, 40, 30, 20, or 10 percent of the unit by height. It would be expected that these measurements should be the same. However, if the middle width 1404 is greater than or less than the top width 1402 and/or the bottom width 1406, then this can indicate a problem such as bowing of the fenestration to be replaced. If the measurements are different by at least a threshold value (such as the middle width 1404 is different than the top width 1402 or the bottom width 1406 by at least a threshold amount), the system can automatically flag the issue, such as issuing an alert or warning to a system user (such as through a display screen or elsewise), providing a notification to the system user, and/or initiate an exception procedure. Threshold amounts of difference between such measurements sufficient to trigger such actions can be selected by a system user, but in some embodiments can be about 1, 2, 3, 4, 5, 6, 7.5, or 10 percent, or more, or an amount falling within a range between any of the foregoing. In some embodiments, threshold amounts of difference between such measurements sufficient to trigger such actions can be ⅛, ¼, ⅜, or ½ of an inch, or more, or an amount falling within a range between any of the foregoing.

Exception procedures can take on various forms herein. In various embodiments, the fenestration replacement system can be configured to issue an alert for a human operator when a determined degree of curvature or radius of curvature exceeds a threshold value. In various embodiments, the fenestration replacement system can be configured to flag particular jobs as requiring verification of sizing by a specialist and/or can route such jobs within a workflow to the specialist for their evaluation. In various embodiments, the fenestration replacement system can be configured to issue an alert or warning to a system operator, such as through a user interface of the system.

In various embodiments, systems herein can be configured to identify signs of distress beyond warping. By way of example, systems herein can be configured to identify color distortion or irregularities which may be a sign of water damage or other types of degradation of underlying materials. In one approach, color distortion can be detected by observing a color change within sensor data herein (such as camera data) wherein the color changes along a surface or part of the window that would otherwise be expected to exhibit the same color along its length. For example, if a sill is identified by the system as described herein, then a change in color exceeding a threshold value along the sill can be taken as a color distortion or irregularity. The system can be configured to undertake various exception procedures (or other operations described herein) upon the detection of a color distortion or irregularity.

Systems herein can also be used to identify circumstances wherein a rough opening or exist frame or fenestration unit is out of square. An out of square condition can be identified by detecting the intersection of fenestration or frame components that are not 90 degrees to one another. For the example the detection of a vertical component that intersects a horizontal component at 89, 88, 87, 86, 85, 80, or less degrees (or an amount falling within a range between any of the foregoing) can be taken as an out of square condition. The system can be configured to undertake various exception procedures (or other operations described herein) upon the detection of an out of square condition.

In some embodiments, systems herein can anticipate fit issues requiring special evaluation of dimensions for a replacement fenestration unit and/or resulting in the application of exception procedures. For example, fit issue can be anticipated by identifying the type of exterior materials used on a wall. As merely one specific example, if the exterior material is brick, then it is typical that the brick will be placed close to the perimeter of the fenestration and there will not be a trim piece covering a gap between the perimeter of the fenestration and the surrounding exterior wall material. Since the brick cannot be easily removed and replaced, this means that the replacement fenestration must be sized to fit within the dimensions of the opening formed by the brick material. In some cases, the system can identify what exterior material is on the surrounding wall and then flag the job as being one that requires verification of sizing by a specialist, issue an alert for a human operator, and/or apply scenario specific offset values when making measurements. The system can be configured to undertake various exception procedures (or other operations described herein) upon the detection of certain types of exterior wall materials such as one or more of brick, stone, or stucco exterior materials.

Figure 15:
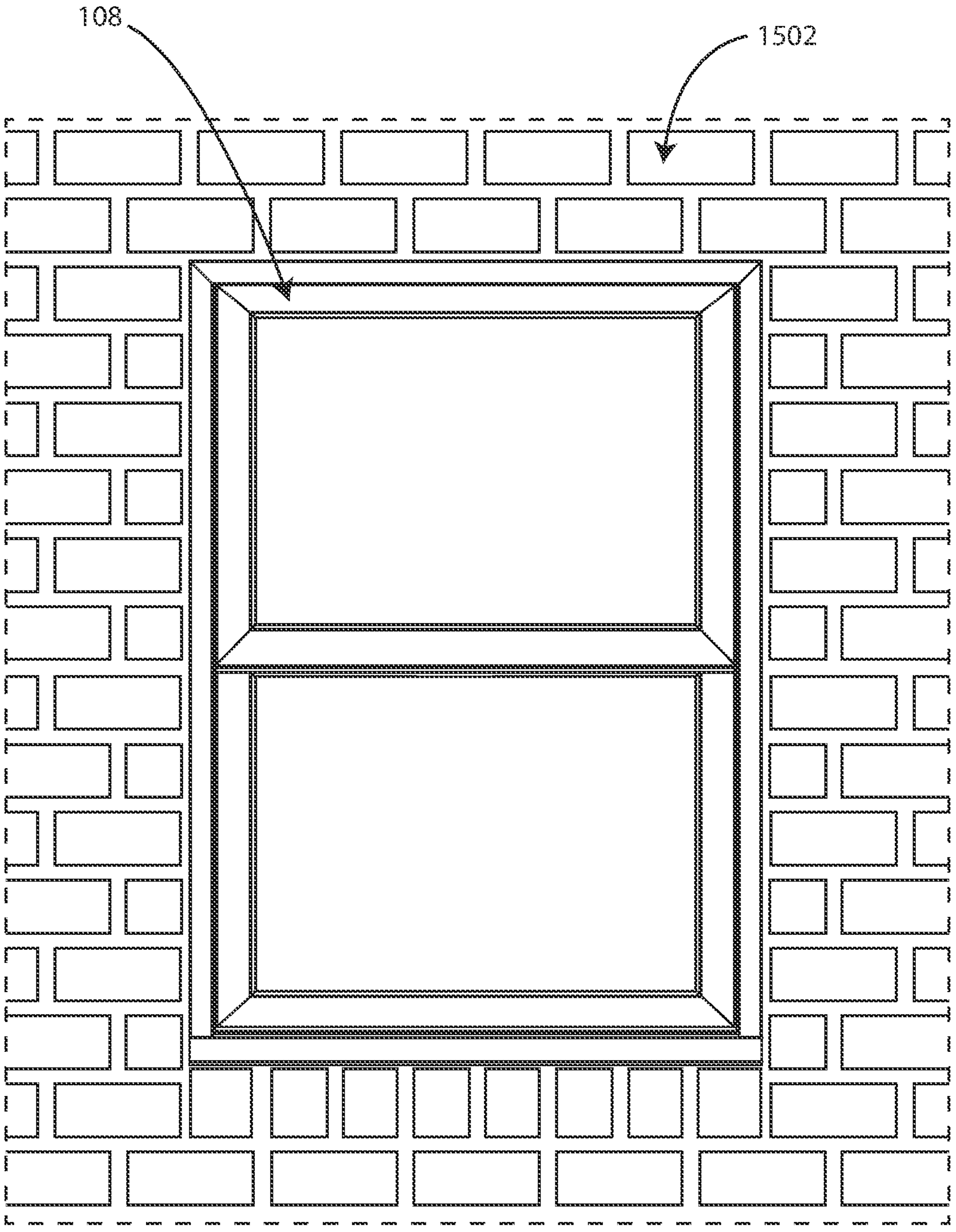
FIG. 15 is a schematic measurement view of a fenestration unit in accordance with various embodiments herein.

Referring now to FIG. 15, a schematic view of a fenestration unit 108 is shown in accordance with various embodiments herein. In this example, the exterior wall material 1502 is evaluated and identified by the system as being brick.

The exterior material can be identified by the system in various ways. In some embodiments, the exterior material can be identified through the performance of a pattern matching algorithm and finding the best match for data representing the current exterior wall material (such as camera data or solid object sensor data) from amongst a set of pattern templates representing different types of exterior wall materials (brick, stone, stucco, vinyl siding, aluminum siding, cement board siding, OSB based siding, and the like). For example, data regarding a given exterior wall such as that gathered with sensors herein can be matched using a machine learning or statistical model against predetermined data (such as templates) reflecting different wall material types. The wall in question can then be deemed to be an example of that exterior wall type representing the closest match. Various pattern matching algorithms can be used herein including, but not limited to, least square template matching, adaptive vision techniques, various statistical models, or the like.

In various embodiments, systems herein can also be used to determine other characteristics of fenestrations. For example, characteristics can include at least one including at least one of a fenestration type, a fenestration manufacturer, a fenestration model, and the like.

Figure 16:
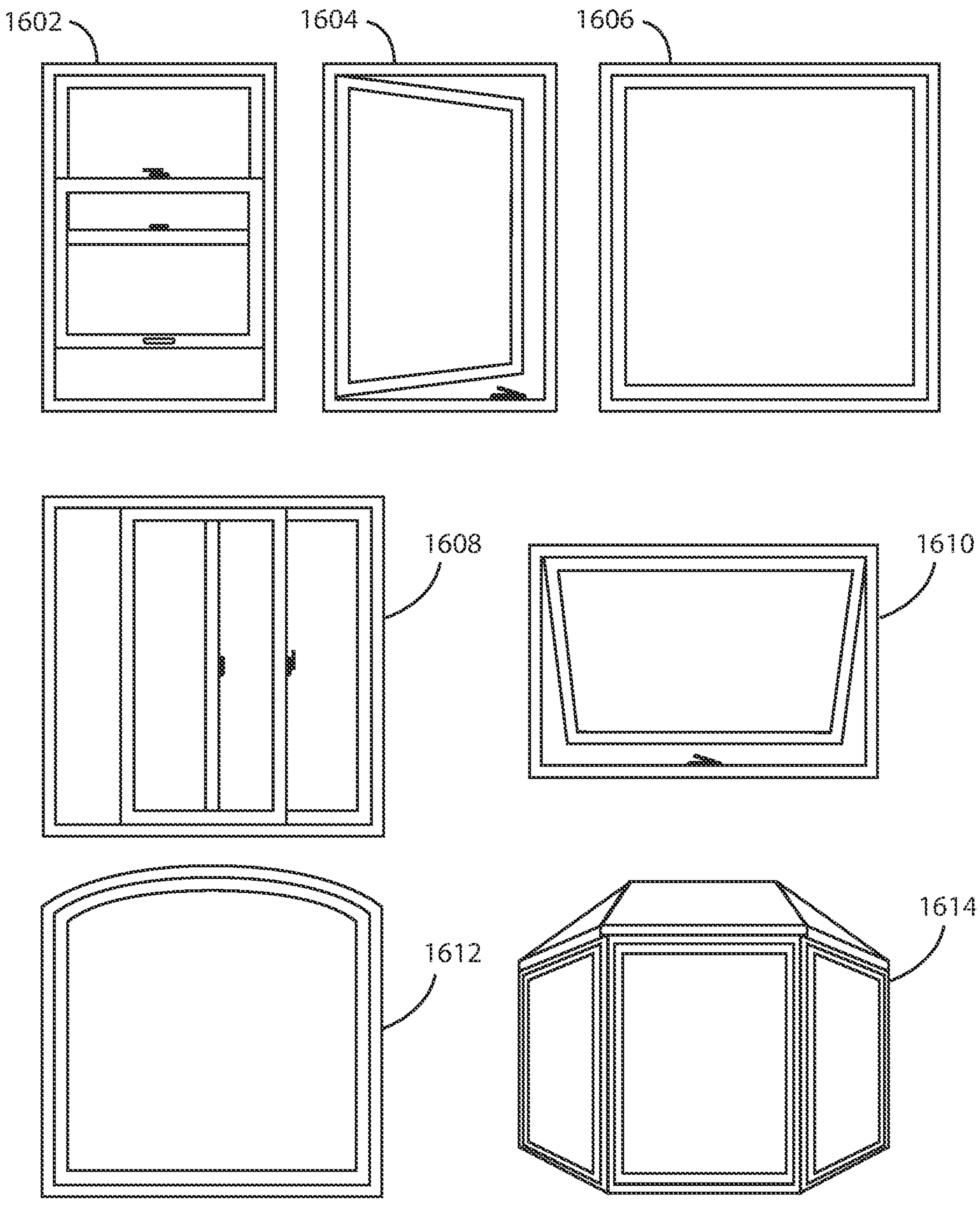
FIG. 16 is a schematic view of different window types in accordance with various embodiments herein.

Referring now to FIG. 16, a schematic view of different window types is shown in accordance with various embodiments herein. In specific, FIG. 16 shows a double-hung window 1602, a casement window 1604, a picture window 1606, a gliding window 1608, an awning window 1610, a bay window 1614, and a specialty window 1612. The system can be configured to be able to identify which type of window a given fenestration unit is. In some embodiments, this can be done based on a pattern matching or classification algorithm. For example, data regarding a given fenestration such as that gathered with sensors herein can be matched using a machine learning or statistical model against predetermined data (such as templates) reflecting different types of windows. The fenestration in question can then be deemed to be an example of that window type representing the closest match. Various pattern matching algorithms can be used herein including, but not limited to, least square template matching, adaptive vision techniques, various statistical models, or the like.

While FIG. 16 illustrates distinguishing between different window types, it will be appreciated that systems herein can also be used to distinguish between different door types, door configurations, panel types and styles, hardware types, and the like.

It will be appreciated that stylistic features of fenestrations units can be also be identified by systems herein using a pattern matching algorithm approach as described above or using other techniques. In addition, aspects like the color of one or more fenestration components can be detected using a camera data of a system herein or another type of optical sensor that is part of the system or in electronic communication with the system. Detecting color can allow the system to facilitate obtaining matching trim, paint, accessories, and the like. In some embodiments, the system can be configured to provide suggestions regarding trim, paint, accessories, or the like that match or are otherwise compatible with detected colors of fenestration components.

Figure 17:
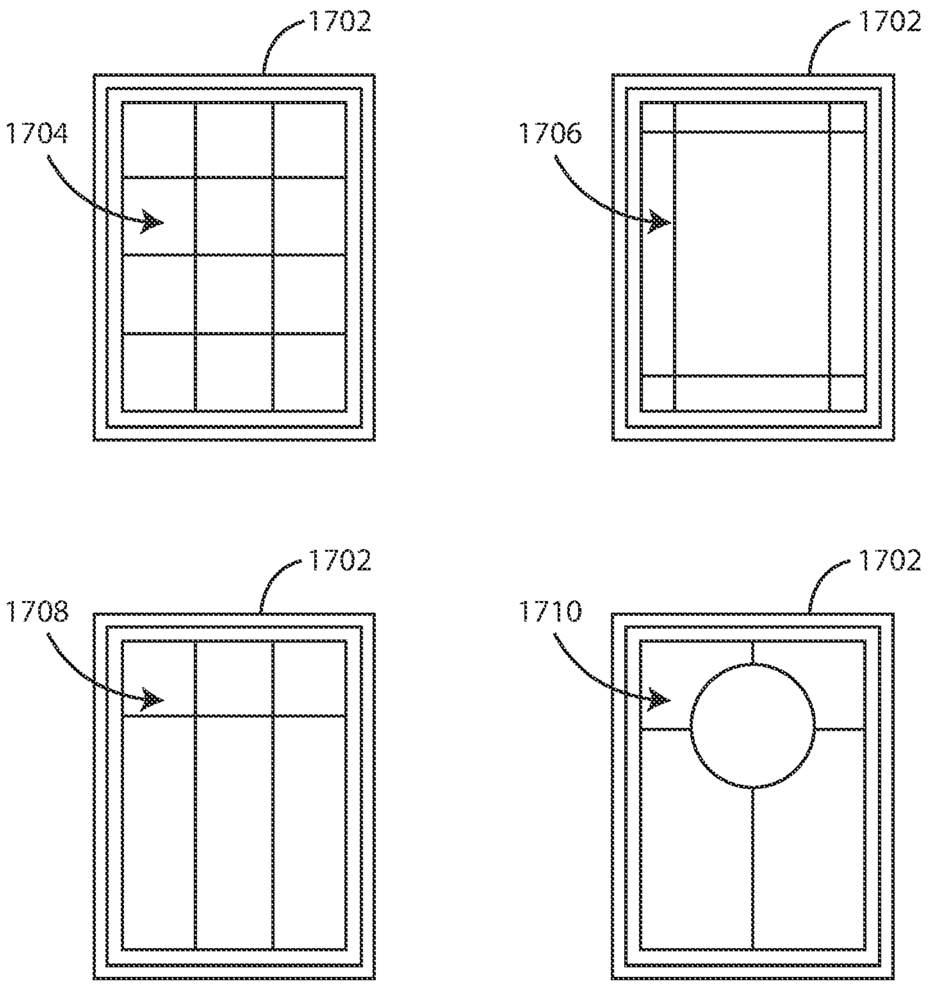
FIG. 17 is a schematic view of fenestrations with different grill styles in accordance with various embodiments herein.

Referring now to FIG. 17 a schematic view is shown of fenestrations 1702 with different grill styles in accordance with various embodiments herein. In particular, FIG. 17 shows a first grill style 1704 (which could be a colonial style), a second grill style 1706 (which could be a prairie style), a third grill style 1708 (which could be a fractional style), and a fourth grill style 1710 (which could be a custom style). The system herein can detect the components of the grill including, for example, corners, edges, points, or surfaces of the same. In some embodiments, the type of grill style can be determined by the system using such detected features. For example, a grill found to include a single top horizontal member, a single bottom horizontal member, and two side members, with each closely adjacent to the perimeter of the sash or pane (similar to second grill style 1706) can be determined by the system to be a prairie style grill. As another example, if the grill components result in a series of similarly sized openings spread across the entire sash or pane, then the system can determine that the grill is a colonial style grill (similar to first grill style 1704). In some embodiments, the system can determine the correct grill style by executing a pattern matching or classification algorithm on data reflecting the grill to be identified (such as optical data, point data, or other data described herein). For example, data regarding the grill portion of a given fenestration such as that gathered with sensors herein can be matched using a machine learning or statistical model against predetermined data (such as templates) reflecting different types of grill styles. The grill in question can then be deemed to be an example of that grill style representing the closest match. Various pattern matching algorithms can be used herein including, but not limited to, machine learning based pattern machine (such as described below), least square template matching, adaptive vision techniques, various statistical models, or the like.

In some cases, such as in the case of a custom grill style, the system can be used to take measurements of the components forming the grill. In this manner, a custom grill can be accurately recreated. This can be performed by the system by identifying corners, edges, surfaces, and points as previously described for each of the components forming the grill and then deriving measurements for the same as described elsewhere herein.

It will be appreciated that other stylistic and/or ornamental design elements can also be identified and/or measured by systems herein. For example fenestration hardware, locks, hinges, trim pieces, and the like can all be identified and/or measured in accordance with embodiments herein.

Figure 18:
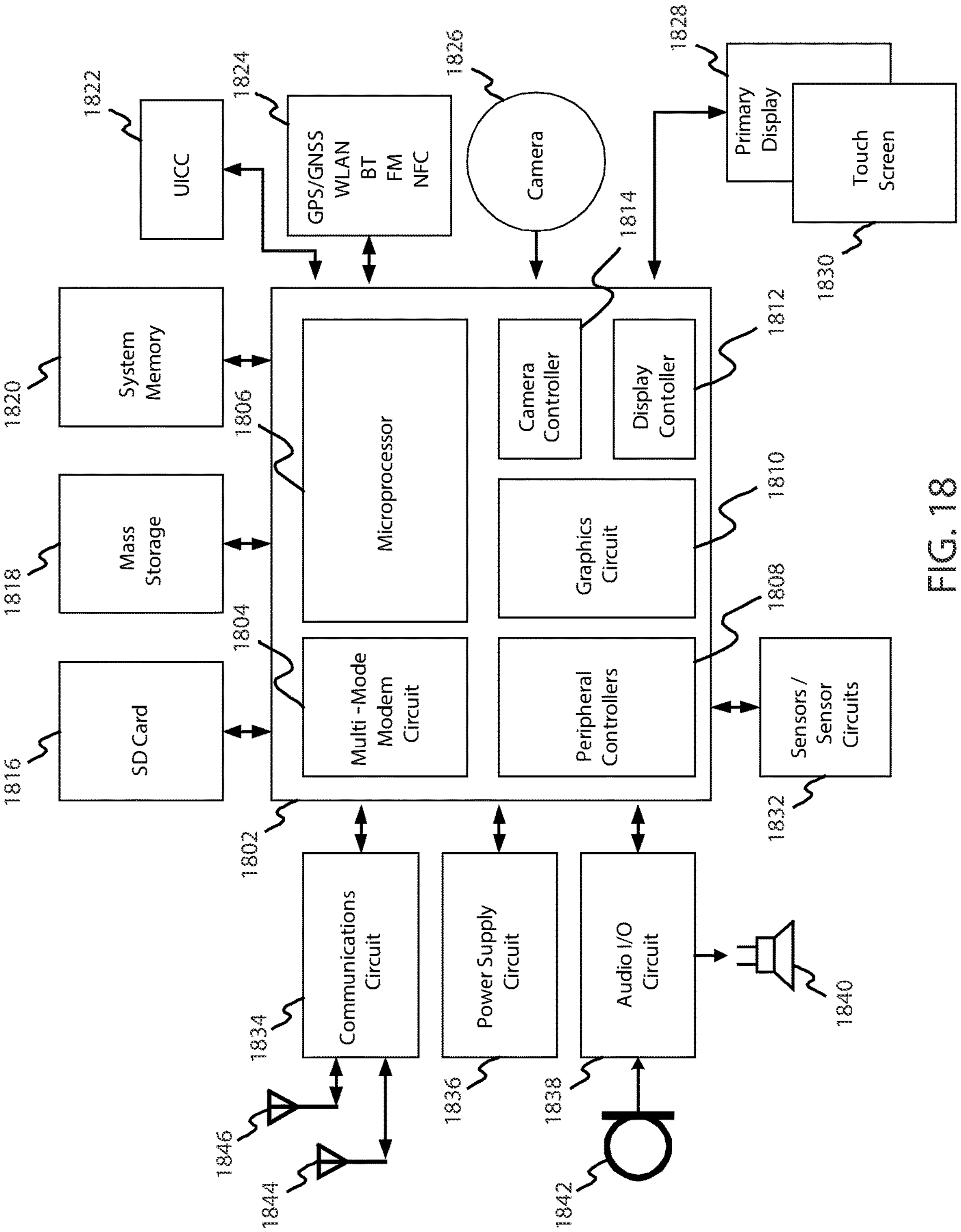
FIG. 18 is a block diagram of components of a system in accordance with various embodiments herein.

Systems herein can include many different components. Referring now to FIG. 18, a block diagram of components of a system is shown in accordance with various embodiments herein. In some embodiments, the components in FIG. 18 can be part of a hand-held device of a system herein. It will be appreciated that this block diagram is just provided by way of illustration and that systems can include greater or lesser numbers of components. The hardware components can include a control circuit 1802. The control circuit 1802 can include various components which may or may not be integrated. In various embodiments, the control circuit 1802 can include a microprocessor 1806, which could also be a microcontroller, FPGA, ASIC, or the like. The control circuit 1802 can also include a multi-mode modem circuit 1804 which can provide communications capability via various wired and wireless standards. The control circuit 1802 can include various peripheral controllers 1808. The control circuit 1802 can also include various sensors/sensor circuits 1832. The sensors/sensor circuit 1832 can include object sensors as described herein including, but not limited to object sensors as described herein including various types of optical sensors and/or LIDAR sensor systems. The control circuit 1802 can also include a graphics circuit 1810, a camera controller 1814, and a display controller 1812. In various embodiments, the control circuit 1802 can interface with an SD card 1816, mass storage 1818, and system memory 1820. In various embodiments, the control circuit 1802 can interface with universal integrated circuit card (UICC) 1822. A spatial location determining circuit (or geolocation circuit) can be included and can take the form of an integrated circuit 1824 that can include components for receiving signals from GPS, GLONASS, BeiDou, Galileo, SBAS, WLAN, BT, FM, NFC type protocols, 5G picocells, or E911. In various embodiments herein, data from the spatial location determining circuit (or geolocation circuit) such as coordinates can be identified and/or can stored by the system associated with fenestration replacement and/or installation jobs.

In various embodiments, the hardware components can include a camera 1826. The camera 1826 can serve as an example of an optical sensor herein. In various embodiments, the control circuit 1802 can interface with a primary display 1828 that can also include a touch screen 1830. In various embodiments, an audio I/O circuit 1838 can interface with the control circuit 1802 as well as a microphone 1842 and a speaker 1840. In various embodiments, a power supply or power supply circuit 1836 can interface with the control circuit 1802 and/or various other circuits herein in order to provide power to the system. In various embodiments, a communications circuit 1834 can be in communication with the control circuit 1802 as well as one or more antennas (1844, 1846).

In various embodiments, the system can specifically include a solid object sensor. In some embodiments, the solid object sensor can include or can be a surface sensor. In some embodiments, the solid object sensor can include at least one including at least one of an optical sensor, a LIDAR sensor, a penetrating electromagnetic wave sensor, and a thermal imaging sensor.

The system can include and/or can generate a user interface to allow the system user to efficiently operate the system (such as the hand-held device thereof) and/or provide input to increase the accuracy of the measurements.

Figure 19:
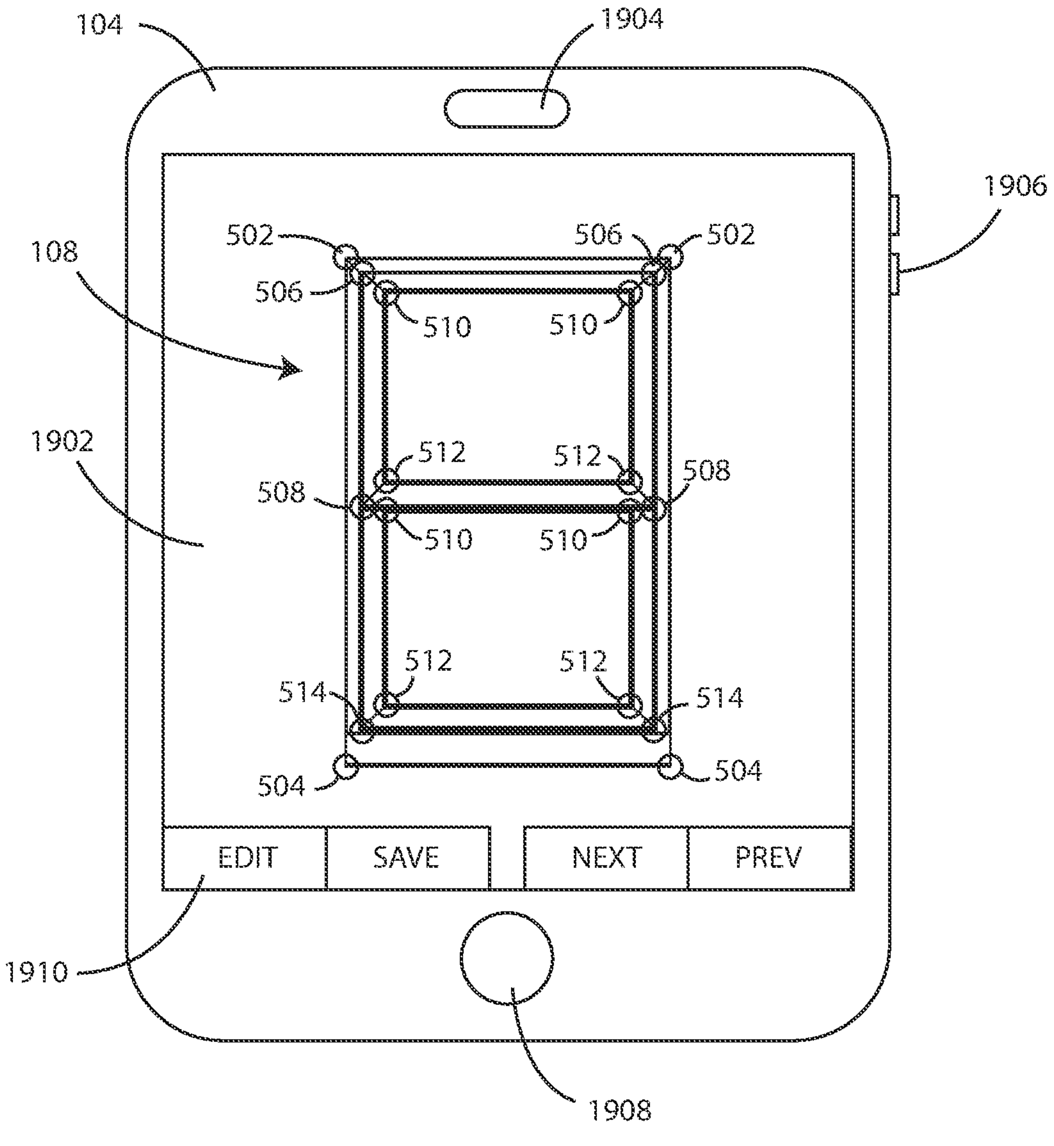
FIG. 19 is a schematic view of a user interface of a system in accordance with various embodiments herein.

Referring now to FIG. 19, a schematic view of a user interface of a system is shown in accordance with various embodiments herein. In specific, the user interface is shown as displayed on a hand-held unit 104 of the system. The hand-held unit 104 includes a display screen 1902 on which the user interface can be displayed. The hand-held unit 104 can also include components such as a speaker 1904, physical side buttons 1906, a physical input button 1908, as well as virtual input buttons 1910 that can be part of the user interface.

An image of the fenestration unit 108 can be displayed on the user interface along with measurement points such as those described with respect to FIG. 5, amongst others. In some embodiments, measurement points can be overlayed on the image of the fenestration unit 108 forming an augmented reality view. The user interface can be touch enabled so that any of the measurement points that might be automatically determined by the system can be repositioned by touching them and dragging them to increase their accuracy. For example, the system user can manually move points associated with a framer outer top corner 502, a sill outer bottom corner 504, a sash outer top corner 506, a top sash outer bottom corner 508, a sash inner top corner 510, a sash inner bottom corner 512, and a bottom sash outer bottom corner 514, amongst others.

In various embodiments herein, distances can be calculated using various computation techniques. In some embodiments, distances can be calculated by first determining the location of two (or more) points and then calculating the distance between them. In two-dimensional space (such as when the measurement is within a specific plane), distance can be calculated between two points according to the following formula:

$$d = \sqrt{((x_2 - x_1)^2 + (y_2 - y_1)^2)}$$

In three-dimensional space, distance can be calculated between two points according to the following formula:

$$d = \sqrt{((x_2 - x_1)^2 + (y_2 - y_1)^2 + (z_2 - z_1)^2)}$$

In various embodiments, the system can undertake various operations to increase the accuracy of measurements. For example, in some embodiments, the system can be configured to enhance measurement accuracy by only using (or overweighting) points from the point cloud intersecting with one or more planes associated with the fenestration. Fenestrations are unique in that even though they are three dimensional most dimensions of significance exist within a specific plane. This insight can be leveraged to increase the accuracy of measurements by only using (or overweighting) points (such as points of a point cloud) that occur within a specific plane (e.g., intersect the plane) in various operations herein. Other points can be discarded or otherwise underweighted when measurements are calculated as described elsewhere herein.

In some embodiments, possible planes can be evaluated by moving in the Z axis in and out of a point cloud in order to find a plane (or planes) most suitable for measurements. Then after Z axis of the plane or planes is set the system can use the points therein and/or can also apply the plane intersection technique described above.

In some embodiments, points (such as points of a point cloud) can be blended and/or averaged (X, Y and/or X, Y, and Z axis average) to create a virtual point for use in measurements herein. For example, in a corner, points can be blended and/or averaged mathematically to create a virtual point for use in measurements herein.

In various embodiments, the fenestration replacement measuring system can be configured to generate a display output, which can form at least part of a user interface, including a dimensionally accurate replacement fenestration unit. In some embodiments, the display output can be an augmented reality type view showing an actual image of an existing fenestration and/or the surroundings of the same along with overlayed information and/or measurements, locations of features, and/or user interface objects related to the same such as pick points. In some embodiments, the display output can include a dimensionally accurate existing fenestration unit. In some embodiments, the display output can include a replacement fenestration unit superimposed over an existing fenestration unit. In some embodiments, the system can be configured to provide a visualization of the replacement fenestration unit in a home to visually show what is being done in the context of the project/job.

In some embodiments, the system can display through the user interface an overlay of measurements on an actual image of a fenestration, such as with an augmented reality display. This can allow the system user to confirm that the measurements made by the system are accurate. In some embodiments, the overlay of measurements of an actual image of a fenestration can be stored by the system to facilitate later evaluation and/or modification. For example, the overlay of measurements on an actual image of a fenestration can be stored and then later recalled, such as at a remote location where specialists might be located, for further evaluation to confirm measurements and/or alter measurements (measurements of an existing fenestration, existing frame, existing rough opening, or other existing components, or measurements of a fenestration needed for replacement and/or installation). As such, systems herein can facilitation measurements and/or manipulations of the same either on site or off site.

Figure 20:
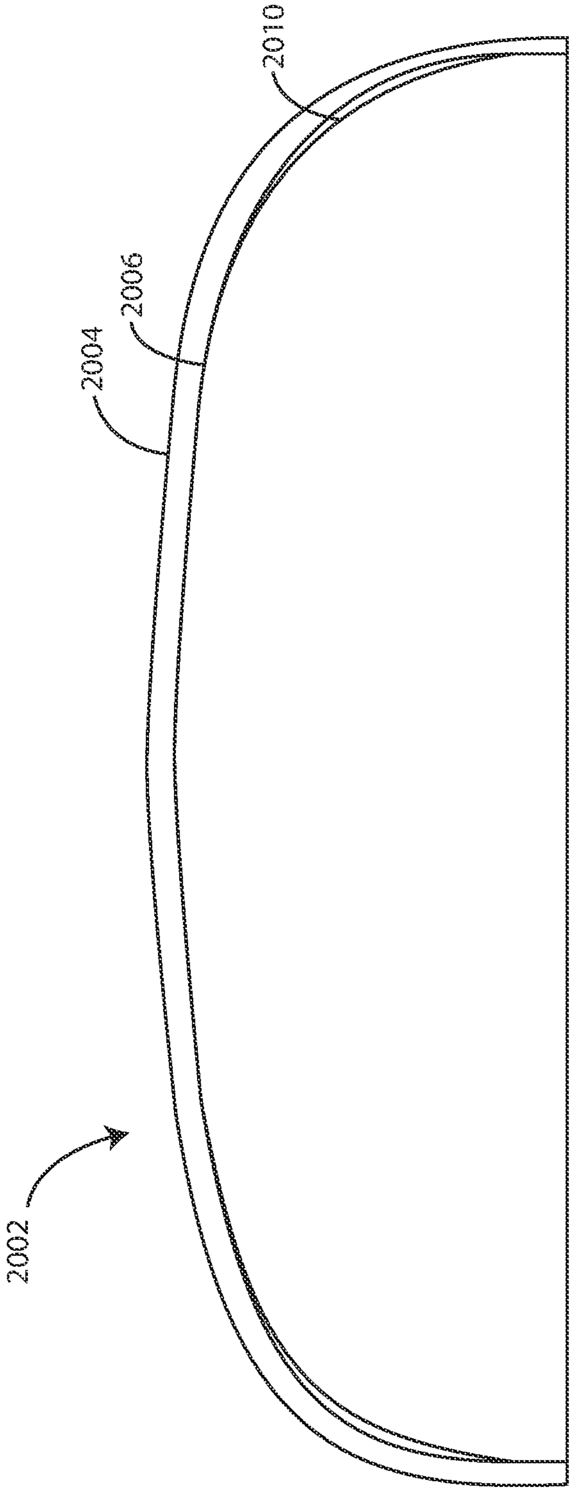
FIG. 20 is a schematic view of a portion of a fenestration unit in accordance with various embodiments herein.

Referring now to FIG. 20, a schematic view of a portion 2002 of a fenestration unit in accordance with various embodiments herein. In this view, an example of an outline or contour of an existing fenestration as may be created by the system in an initial operation is shown as line 2004. In some cases, this can be manipulated by a system user (on site or off site, in real time or later on) to create a corrected or modified outline or contour shown as line 2006. This can then be converted by the system into a dimensional model of a fenestration needed for replacement or installation, the perimeter of which is shown as line 2010.

In some scenarios herein, sensor data may be captured and initial measurements may be made in the field (e.g., on site) by a sales person or even a consumer or homeowner using the system. Then, later an individual (located remotely/off site) with expertise in aspects of fenestration replacements or installation such as measurements of the same can use the sensor data and/or initial measurement data to make definitive measurements to enable the production of fenestrations units meeting the spatial requirements.

Figure 21:
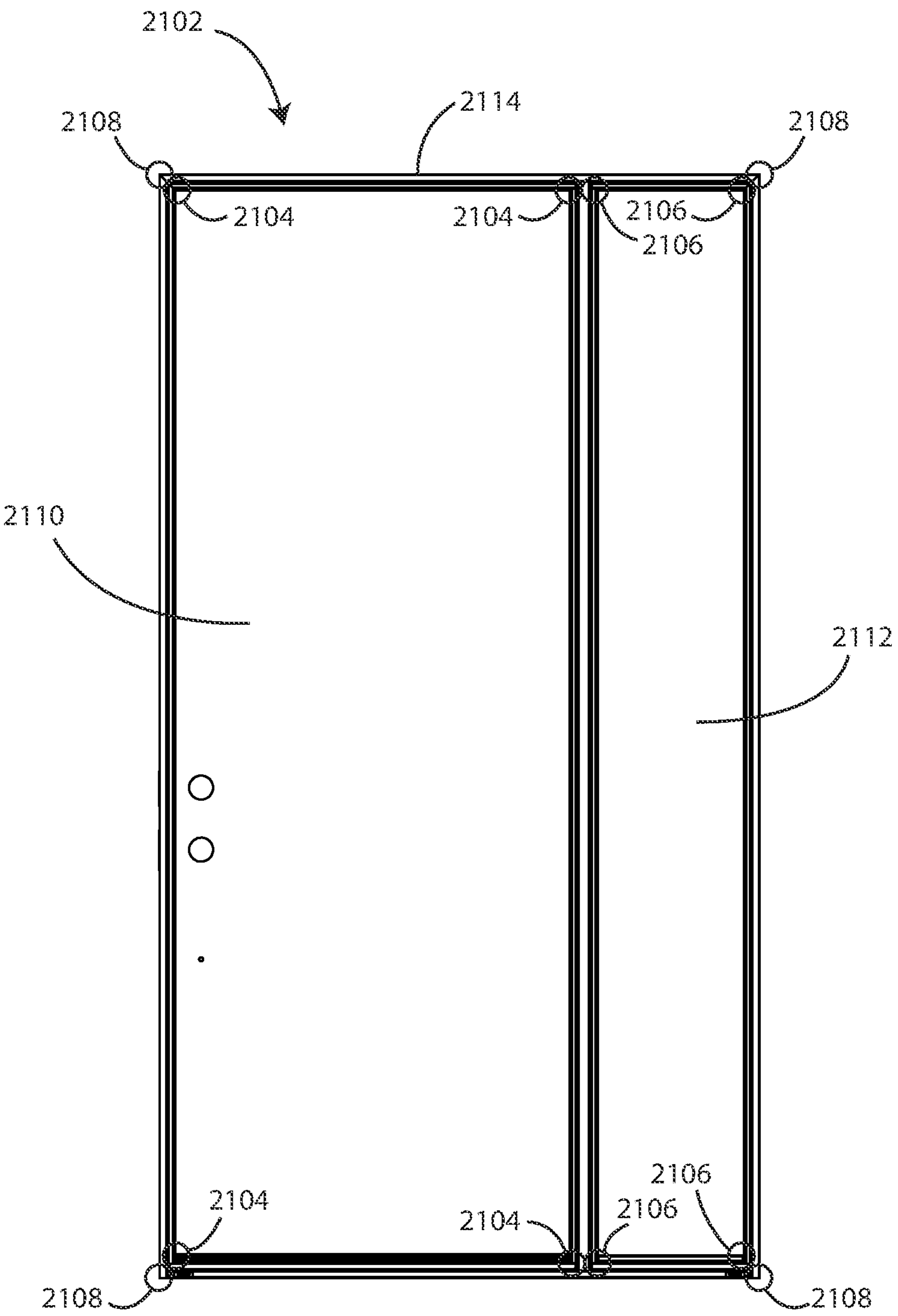
FIG. 21 is a schematic view of another type of fenestration unit in accordance with various embodiments herein.

Many different types of fenestration units are contemplated herein including, but not limited to, windows, patio doors, entry doors, and the like. Referring now to FIG. 21, a schematic view of a fenestration unit 2102 in accordance with various embodiments herein. In this example, the fenestration unit 2102 is an entry door or door system. The door system can include a door frame 2114, a door assembly 2110, and a sidelight 2112. Embodiments of systems herein can be used to take measurements of components of the door system using techniques as described elsewhere herein. For example, in some embodiments, the system can identify outer corners 2104 of the door assembly 2110 and/or inner corners of the door frame 2114. The system can also identify outer corners 2106 of the sidelight 2112. The system can also identify outer corners 2108 of the door frame 2114. Edges and/or corners of various other door system components (and/or window system components) can also be identified using systems herein including, but not limited to edges and/or corners of glazings, jambs, mullions, thresholds, sills, casings, mouldings, transoms, muntin bars, divided lite bars, grilles, panels, railings, stiles, hinges, bore holes, locksets, and the like.

Pattern Detection/Recognition

In various embodiments herein, the system can execute a pattern detection and/or pattern recognition operation. For example, the system can execute a pattern detection and/or pattern recognition operation to determine the window type as described with reference to FIG. 16 or the grill style as described with reference to FIG. 17. Such pattern recognition operations can be executed using supervised and/or unsupervised machine learning techniques. Pattern recognition operations can be executed using statistical pattern recognition approaches, syntactic pattern recognition approaches, neural pattern recognition approaches, template matching approaches, and/or combinations thereof or the like. Methods for pattern recognition herein can specifically include the use of neural networks, support vector machines, decision trees, K-nearest neighbors, and naïve Bayes approaches. In some embodiments herein, operations associated with pattern recognition can include one or more of feature extraction, classification, and post-processing. In some embodiments herein, a multi-node decision tree can be used to reach a binary result (e.g. binary classification) on whether a given pattern (such as a template pattern) is matched or not.

Methods

Many different methods are contemplated herein, including, but not limited to, methods of making, methods of using, and the like. Aspects of system/device operation described elsewhere herein can be performed as operations of one or more methods in accordance with various embodiments herein.

In various embodiments, operations described herein and method steps can be performed as part of a computer-implemented method executed by one or more processors of one or more computing devices. In various embodiments, operations described herein and method steps can be implemented instructions stored on a non-transitory, computer-readable medium that, when executed by one or more processors, cause a system to execute the operations and/or steps.

In an embodiment, a method of measuring dimensions needed for a fenestration replacement is included. The method can include detecting physical features of an existing fenestration unit using data from a solid object sensor, measuring one or more dimensions of the existing fenestration unit using the physical features, and estimating one or more dimensions needed for fenestration replacement using the measured dimensions.

In an embodiment, the method can further include detecting physical features of the existing fenestration unit using data from the solid object sensor while pointing upward at an angle of at least 30 degrees relative to a horizontal plane. In an embodiment, the method can further include detecting physical features of the existing fenestration unit using data from the solid object sensor while pointing upward at an angle of at least 45 degrees relative to a horizontal plane.

In an embodiment, the method can further include interpolating portions of the physical features that are at least partially obscured.

In an embodiment, the method can further include cross-referencing dimensions of the existing fenestration unit as measured from an interior side with those as measured from an exterior side. In an embodiment, the method can further include cross-referencing dimensions of the existing fenestration unit as measured from an interior side with those as measured from an exterior side using one or more physical and/or virtual markers.

In an embodiment, the method can further include calculating differences in dimensions of the existing fenestration unit as measured from an interior side with those as measured from an exterior side. In an embodiment, the method can further include issuing an alert or warning to a system user if the calculated differences exceed a threshold value.

In an embodiment, the method can further include creating a dimensional model for a replacement fenestration unit using at least one of the measured one or more dimensions of the existing fenestration unit and the estimated one or more dimensions needed for fenestration replacement.

In an embodiment, the method can further include accepting user input from a system user regarding the physical features and incorporate the same when generating a measurement of the existing fenestration unit or an estimate of the dimensions needed for a fenestration replacement.

In an embodiment, the method can further include accepting user input from a system user regarding the physical features and storing the same. In an embodiment, the method can further include using the stored user input as part of a training data set in a supervised machine learning operation to generate a machine learning model for dimension estimation.

In an embodiment, the method can further include generating a display output including a dimensionally accurate replacement fenestration unit superimposed over the existing fenestration unit.

In an embodiment, the method can further include detecting physical features of a replacement fenestration unit after installation using data from the solid object sensor and measure one or more dimensions of the replacement fenestration unit using the physical features.

In an embodiment, the method can further include calculating a number of scaffolds and/or ladders needed to replace the existing fenestration unit. In an embodiment, the method can further include calculating amounts of tools and resources needed to replace the existing fenestration unit.

In an embodiment, the method can further include identifying at least one of warping, color distortion or irregularities, and out of square conditions of an existing fenestration, or frame, or rough opening. In an embodiment, the method can further include issuing an alert or warning to a system user if warping, color distortion or irregularities, or an out of square condition are detected. In an embodiment, the method can further include initiating review by a specialist or project manager if warping, color distortion or irregularities, or an out of square condition are detected.

In an embodiment, the method can further include identifying an exterior wall material. In an embodiment, the method can further include initiating review by a specialist or project manager if a predetermined exterior wall material is identified.

In an embodiment, the method can further include displaying an overlay of measurements on an actual image of a fenestration.

In an embodiment, the method can further include storing measured dimensions and/or estimated dimensions needed for fenestration replacement along with sensor data for later review off site.

In an embodiment, the method can further include detecting the presence of a screen on the existing fenestration unit using data from the solid object sensor. In an embodiment, the method can further include initiating a responsive action when the presence of a screen is detected.

In an embodiment, a method of measuring dimensions needed for a fenestration installation project is included. The method can include detecting physical features of an existing building structure using data from a solid object sensor, measuring one or more dimensions of the existing building structure using the detected surfaces, and estimating one or more dimensions needed for fenestration installation using the measured dimensions.

In an embodiment, a method of gathering data for a fenestration replacement project is included. The method can include detecting physical features of an existing fenestration unit using data from a solid object sensor and determining one or more characteristics of the existing fenestration unit based on the detected physical features.

In an embodiment, the method can further include estimating one or more dimensions needed for fenestration replacement by applying offset values to measured physical dimensions based on at least one of the fenestration type, the fenestration manufacturer, and the fenestration model.

In an embodiment, the one or more characteristics of the existing fenestration unit can include at least one selected from the group consisting of a fenestration type, a fenestration manufacturer, a fenestration model, and a degree of curvature of normally straight components. In an embodiment, the method can further include executing an exception procedure when a determined degree of curvature exceeds a threshold value. In an embodiment, the method can further include issuing an alert for a human operator when a determined degree of curvature exceeds a threshold value.

Aspects may be better understood with reference to the following examples. These examples are intended to be representative of specific embodiments, but are not intended as limiting the overall scope of embodiments herein.

EXAMPLES

Example 1: Accuracy of System Measurements Vs. Human Technician Measurements A fenestration replacement measuring system was assembled consistent with embodiments herein. Specifically, the fenestration replacement measuring system included a LIDAR sensor producing a point cloud from which surfaces were identified followed by measurement of height and width of fenestration units.

Measurements of a set (N=10) of test windows were made (both interior and exterior) using the measuring system from a distance of approximately 6 to 8' for interior measurements and 8 to 15' for exterior measurements. Measurement angles varied from 25 to 155 degrees. Measurements of the set of test windows were also made manually by two separate measurement technicians (recognizing that the technician measurements may have degree of inaccuracy) and averaged. The measurements were then compared (system measurement vs. average of measurement technicians). The differences in measurements were as shown in Table 1 below (all dimensions in inches):

TABLE 1

| | Interior Width | Interior Height | Exterior Width | Exterior Height |
|---|---|---|---|---|
| Unit 1 | 0.56 | 0.44 | 1.06 | 0.75 |
| Unit 2 | −0.31 | 0.00 | −0.63 | 0.13 |
| Unit 3 | 0.44 | 0.38 | 0.56 | 3.06 |
| Unit 4 | 1.69 | 0.31 | 0.44 | 0.00 |
| Unit 5 | 0.06 | 0.44 | 0.13 | 0.13 |
| Unit 6 | 1.19 | 0.25 | 0.56 | −0.44 |
| Unit 7 | 0.13 | 0.38 | 0.63 | −0.56 |
| Unit 8 | 0.38 | −0.06 | 0.88 | 0.38 |
| Unit 9 | −0.06 | −0.63 | 0.00 | −0.06 |
| Unit 10 | 1.31 | 0.38 | −0.44 | −0.50 |
| Average | 0.54 | 0.19 | 0.32 | 0.29 |

It was found that the differences were, on average, 0.54 inches for interior width, 0.19 inches for interior height, 0.32 inches for exterior width, and 0.29 inches for exterior height. This example shows that fenestration replacement measuring systems herein are capable of highly accurate measurements of fenestrations relative to human technicians.

Example 2: Accuracy of System Measurements for Known Dimensions

A fenestration replacement measuring system was assembled consistent with embodiments herein. Specifically, the fenestration replacement measuring system included a LIDAR sensor producing a point cloud from which surfaces were identified followed by measurement of height and width of sample items. The actual dimensions of the sample items were known and thus the accuracy of the measuring system could be assessed. Measurements were taken from distances (measurement system to item being measured) at angles (indicated in the horizontal plane with reference to the surface on which the sample items were placed such that a 90 degree angle is directly perpendicular to the surface) and for elevations (with the measurement system being held at roughly 6 feet of elevation) as indicated in Table 2.

TABLE 2

| | Actual Height | Actual Width | Measurement Distance | Measurement Angle | Elevation of Item |
|---|---|---|---|---|---|
| Test 1 | $18\frac{3}{4}$ | $23\frac{1}{4}$ | 7' | 90 | 6' |
| 1A | | | | | |
| 1B | | | | | |
| 1C | | | | | |
| 1D | | | | | |
| Test 2 | 28 | 48 | 12' | 45 | 6' |
| 2A | | | | | |
| 2B | | | | | |
| 2C | | | | | |
| 2D | | | | | |
| Test 3 | 30 | 42 | 18' | 30 | 12' |
| 3A | | | | | |
| 3B | | | | | |
| 3C | | | | | |
| 3D | | | | | |

The results were as shown in TABLE 3 below:

TABLE 3

| | Measured Height | Measured Width | Height Diff. | Width Diff. |
|---|---|---|---|---|
| Test 1 | | | | |
| 1A | $18\frac{7}{8}$ | $24\frac{1}{4}$ | $\frac{1}{8}$ | $\frac{1}{4}$ |
| 1B | $18\frac{7}{8}$ | $24\frac{3}{16}$ | $\frac{1}{8}$ | $\frac{3}{16}$ |
| 1C | $18\frac{7}{8}$ | $24\frac{1}{16}$ | $\frac{1}{8}$ | $\frac{1}{16}$ |
| 1D | $18\frac{7}{8}$ | $24\frac{1}{16}$ | $\frac{1}{8}$ | $\frac{1}{16}$ |
| Test 2 | | | | |
| 2A | $28\frac{1}{16}$ | $48\frac{1}{8}$ | $\frac{1}{16}$ | $\frac{1}{8}$ |
| 2B | $28\frac{1}{8}$ | $48\frac{1}{8}$ | $\frac{1}{8}$ | $\frac{1}{8}$ |
| 2C | $28\frac{1}{8}$ | $48\frac{1}{8}$ | $\frac{1}{8}$ | $\frac{1}{8}$ |
| 2D | $27\frac{13}{16}$ | $48\frac{1}{8}$ | $\frac{3}{16}$ | $\frac{1}{8}$ |
| Test 3 | | | | |
| 3A | $29\frac{15}{16}$ | $41\frac{15}{16}$ | $\frac{1}{16}$ | $\frac{1}{16}$ |
| 3B | $29\frac{13}{16}$ | $41\frac{13}{16}$ | $\frac{3}{16}$ | $\frac{3}{16}$ |
| 3C | $29\frac{11}{16}$ | 42 | $\frac{1}{4}$ | 0 |
| 3D | $30\frac{1}{16}$ | $42\frac{1}{4}$ | $\frac{1}{16}$ | $\frac{1}{4}$ |

This example shows that fenestration replacement measuring systems herein are capable of highly accurate measurements.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A fenestration replacement measuring system comprising:

a control circuit; and a solid object sensor, wherein the solid object sensor is in electrical communication with the control circuit;

wherein the fenestration replacement measuring system is configured to detect physical features of an existing fenestration unit using data from the solid object sensor;

measure one or more dimensions of the existing fenestration unit using the physical features; and estimate one or more dimensions needed for fenestration replacement using the measured dimensions; and cross-reference dimensions of the existing fenestration unit as measured from an interior side with those as measured from an exterior side using one or more physical and/or virtual markers.

2. The fenestration replacement measuring system of claim 1, the physical features comprising at least one selected from the group consisting of spatial points, edges, surfaces, and corners.

3. The fenestration replacement measuring system of claim 1, the solid object sensor comprising a surface sensor.

4. The fenestration replacement measuring system of claim 1, the solid object sensor comprising at least one selected from the group consisting of an optical sensor, a LIDAR sensor, a penetrating electromagnetic wave sensor, a thermal imaging sensor, and an X-ray sensor.

5. The fenestration replacement measuring system of claim 1, the one or more dimensions needed for fenestration replacement comprising at least one selected from the group consisting of a rough opening size and a frame size.

6. The fenestration replacement measuring system of claim 1, wherein the fenestration replacement measuring system is configured to detect physical features of an existing fenestration unit using data from the solid object sensor while pointing upward at an angle of at least 30 degrees relative to a horizontal plane.

7. The fenestration replacement measuring system of claim 1, wherein the fenestration replacement measuring system is configured to interpolate portions of the physical features that are at least partially obscured.

8. The fenestration replacement measuring system of claim 7, wherein the physical features that are at least partially obscured are located adjacent the sill of the existing fenestration unit.

9. The fenestration replacement measuring system of claim 1, wherein the fenestration replacement measuring system is configured to create a dimensional model for a replacement fenestration unit using at least one of the measured one or more dimensions of the existing fenestration unit and the estimated one or more dimensions needed for fenestration replacement.

10. The fenestration replacement measuring system of claim 1, wherein the fenestration replacement measuring system is configured to accept user input from a system user regarding the physical features and incorporate the same when generating a measurement of the existing fenestration unit or an estimate of the dimensions needed for a fenestration replacement.

11. The fenestration replacement measuring system of claim 10, the user input comprising locations of physical features and/or points regarding the same.

12. The fenestration replacement measuring system of claim 1, wherein the fenestration replacement measuring system is configured to calculate a number of scaffolds and/or ladders needed to replace the existing fenestration unit.

13. The fenestration replacement measuring system of claim 1, wherein the fenestration replacement measuring system is configured to identify at least one of warping, color distortion or irregularities, and out of square conditions of an existing fenestration, or frame, or rough opening.

14. The fenestration replacement measuring system of claim 1, wherein the fenestration replacement measuring system is configured to automatically take horizontal measurements of a feature at multiple locations and compare a midpoint measurement with at least one of a top measurement and a bottom measurement.

15. The fenestration replacement measuring system of claim 1, wherein the fenestration replacement measuring system is configured to identify an exterior wall material.

16. The fenestration replacement measuring system of claim 1, wherein the fenestration replacement measuring system is configured to detect the presence of a screen on the existing fenestration unit using data from the solid object sensor.

17. The fenestration replacement measuring system of claim 1, wherein the fenestration replacement measuring system is configured to overweight measurement points that intersect with a selected plane.

18. The fenestration replacement measuring system of claim 1, wherein the fenestration replacement measuring system is configured to combine two or more measurement points to create a virtual measurement point.

19. A fenestration replacement measuring system comprising:

a control circuit; and a solid object sensor, wherein the solid object sensor is in electrical communication with the control circuit;

wherein the fenestration replacement measuring system is configured to detect physical features of an existing fenestration unit using data from the solid object sensor;

measure one or more dimensions of the existing fenestration unit using the physical features; and estimate one or more dimensions needed for fenestration replacement using the measured dimensions; and identify at least one of warping, color distortion or irregularities, and out of square conditions of an existing fenestration, or frame, or rough opening.

20. A fenestration replacement measuring system comprising:

a control circuit; and a solid object sensor, wherein the solid object sensor is in electrical communication with the control circuit;

wherein the fenestration replacement measuring system is configured to detect physical features of an existing fenestration unit using data from the solid object sensor;

measure one or more dimensions of the existing fenestration unit using the physical features; and estimate one or more dimensions needed for fenestration replacement using the measured dimensions; and detect the presence of a screen on the existing fenestration unit using data from the solid object sensor.

* * * * *